(12) United States Patent
Khoryaev et al.

(10) Patent No.: US 9,288,797 B2
(45) Date of Patent: Mar. 15, 2016

(54) SUPPORT FOR ASYNCHRONOUS ADAPTATION TO UPLINK AND DOWNLINK TRAFFIC DEMANDS FOR WIRELESS COMMUNICATION

(75) Inventors: Alexey Khoryaev, Dzerzhinsk (RU); Mikhail Shilov, Nizhny Novgorod (RU); Sergey Panteleev, Nizhny Novgorod (RU); Andrey Chervyakov, Nizhny Novgorod (RU); Artyom Lomayev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 294 days.

(21) Appl. No.: 13/592,598

(22) Filed: Aug. 23, 2012

(65) Prior Publication Data

US 2013/0242812 A1    Sep. 19, 2013

Related U.S. Application Data

(60) Provisional application No. 61/612,188, filed on Mar. 16, 2012.

(51) Int. Cl.
*H04W 72/08* (2009.01)
*H04W 72/04* (2009.01)
(Continued)

(52) U.S. Cl.
CPC ........... *H04W 72/0413* (2013.01); *H04L 1/189* (2013.01); *H04L 1/1825* (2013.01);
(Continued)

(58) Field of Classification Search
CPC ............. H04W 16/04–16/16; H04W 28/0236; H04W 24/02; H04W 4/06; H04W 52/0229; H04W 52/143; H04W 72/0413; H04W 72/1268; H04W 74/085; H04L 1/1896; H04L 5/0053; H04L 5/0055; H04L 5/1438; H04N 21/41407; H04N 21/6408; Y02B 60/50

USPC ....................... 370/277–278, 282, 310.2, 315, 370/328–338, 341; 455/422.1–460, 464, 455/509, 524–525
See application file for complete search history.

(56) References Cited

U.S. PATENT DOCUMENTS

2010/0008282 A1    1/2010    Bhattad et al.
2010/0214997 A1*  8/2010    Tao et al. ..................... 370/329
(Continued)

FOREIGN PATENT DOCUMENTS

| EP | 2413623 A1 | 2/2012 |
|---|---|---|
| WO | WO 01/99545 A1 | 12/2001 |
| WO | 2008/155732 A2 | 12/2008 |

OTHER PUBLICATIONS

Dynamic TDD and Fixed Cellular Networks, Li et al, "Dynamic TDD and Fixed Cellular Networks" IEEE Communications Letters, vol. 4, No. 7, Jul. 2000, pp. 218-220, pp. 218-220.
(Continued)

*Primary Examiner* — Charles C Jiang
*Assistant Examiner* — Mohamed Kamara
(74) *Attorney, Agent, or Firm* — Thorpe North & Western LLP

(57) ABSTRACT

Technology is discussed to allow transmission points within a Wireless Wide Area Network (WWAN) to adapt to Up Link (UL) and Down Link (DL) traffic demands independently. To mitigate potential interference arising from transmission points scheduled for conflicting UL and DL transmissions, measurements between transmission points can be made to indicate a level of coupling. Based on the various levels of coupling between transmission points, clusters can be formed. Where a high level of coupling is present, transmission points can be included in a common cluster. Where a low level of coupling is present, they can be isolated. Transmission points within the same cluster are scheduled with a common pattern of UL and DL transmissions to avoid interference. Transmission points in different clusters can have different patterns of UL and DL transmission to independently adapt to the relative demands for UL and DL transmissions experienced within these different clusters.

24 Claims, 14 Drawing Sheets

(51) Int. Cl.

| | | |
|---|---|---|
| *H04W 24/02* | (2009.01) | |
| *H04N 21/414* | (2011.01) | |
| *H04N 21/6408* | (2011.01) | |
| *H04W 4/06* | (2009.01) | |
| *H04L 5/00* | (2006.01) | |
| *H04L 5/14* | (2006.01) | |
| *H04L 1/18* | (2006.01) | |
| *H04W 74/08* | (2009.01) | |
| *H04L 12/18* | (2006.01) | |
| *H04L 29/06* | (2006.01) | |
| *H04N 21/258* | (2011.01) | |
| *H04N 21/6405* | (2011.01) | |
| *H04W 24/00* | (2009.01) | |
| *H04W 28/02* | (2009.01) | |
| *H04W 76/04* | (2009.01) | |
| *H04W 52/02* | (2009.01) | |
| *H04W 52/14* | (2009.01) | |
| *H04W 72/12* | (2009.01) | |
| *H04L 1/00* | (2006.01) | |

(52) U.S. Cl.
CPC ............ *H04L1/1854* (2013.01); *H04L 1/1877* (2013.01); *H04L 1/1887* (2013.01); *H04L 1/1896* (2013.01); *H04L 5/001* (2013.01); *H04L 5/0053* (2013.01); *H04L 5/0055* (2013.01); *H04L 5/14* (2013.01); *H04L 5/1438* (2013.01); *H04L 5/1469* (2013.01); *H04L 12/189* (2013.01); *H04L 65/601* (2013.01); *H04N 21/25841* (2013.01); *H04N 21/41407* (2013.01); *H04N 21/6405* (2013.01); *H04N 21/6408* (2013.01); *H04W 4/06* (2013.01); *H04W 24/00* (2013.01); *H04W 24/02* (2013.01); *H04W 28/0236* (2013.01); *H04W 28/0268* (2013.01); *H04W 28/0278* (2013.01); *H04W 52/02* (2013.01); *H04W 52/0206* (2013.01); *H04W 52/0209* (2013.01); *H04W 52/0235* (2013.01); *H04W 72/04* (2013.01); *H04W 72/042* (2013.01); *H04W 72/0406* (2013.01); *H04W 72/048* (2013.01); *H04W 72/082* (2013.01); *H04W 72/1205* (2013.01); *H04W 72/1284* (2013.01); *H04W 74/085* (2013.01); *H04W 76/048* (2013.01); *H04L 1/0033* (2013.01); *H04L 1/1819* (2013.01); *H04W 52/0229* (2013.01); *H04W 52/143* (2013.01); *H04W 72/0446* (2013.01); *H04W 72/1268* (2013.01); *Y02B 60/50* (2013.01)

(56) References Cited

U.S. PATENT DOCUMENTS

| | | | |
|---|---|---|---|
| 2010/0317364 A1* | 12/2010 | Zhang et al. ............... | 455/452.2 |
| 2010/0329162 A1* | 12/2010 | Kadous et al. ................ | 370/310 |
| 2011/0200029 A1 | 8/2011 | Farmandar et al. | |
| 2011/0268006 A1 | 11/2011 | Koskela et al. | |
| 2011/0294527 A1 | 12/2011 | Brueck et al. | |
| 2011/0317656 A1 | 12/2011 | Rajih et al. | |
| 2012/0026956 A1* | 2/2012 | Benjebbour et al. ........... | 370/329 |
| 2012/0028664 A1* | 2/2012 | Zhang et al. ................... | 455/501 |
| 2012/0281573 A1* | 11/2012 | Kazmi et al. .................. | 370/252 |
| 2013/0083707 A1* | 4/2013 | Wang ............................ | 370/280 |
| 2013/0083736 A1* | 4/2013 | Yin et al. ...................... | 370/329 |
| 2013/0155898 A1* | 6/2013 | Yin et al. ...................... | 370/254 |

OTHER PUBLICATIONS

Combination of Dynamic-TDD and Static-TDD Based on Adaptive Power Control, Lee et al. "Combination of Dynamic-TDD and Static-TDD Based on Adaptive Power Control" Department of Electrical Engineering and Computer Science Korea Advanced Institute of Science and Technology (KAIST), 5 pages.

Spectral Efficiency of Time Division Duplex Fixed Wireless Cellular System for Dynamic Traffic, Spectral Efficiency of Time Division Duplex Fixed Wireless Cellular System for Dynamic Traffic, Wuncheol Jeong and Mohsen Kavehrad, FIEEE, 5 pages.

International Search Report and Written Opinion received for PCT Patent Application No. PCT/US2013/032323 mailed on Jun. 26, 2013, 9 pages.

Search Report for European application 13761873.2 dated Nov. 10, 2015, 10 pages.

\* cited by examiner

SUPPORT FOR ASYNCHRONOUS ADAPTATION TO UPLINK AND DOWNLINK TRAFFIC DEMANDS FOR WIRELESS COMMUNICATION

RELATED APPLICATIONS

This application claims the benefit of and hereby incorporates by reference U.S. Provisional Patent Application Ser. No. 61/612,188, filed Mar. 16, 2012, with a docket number P44413Z.

BACKGROUND

Many Wireless Wide Area Networks (WWAN) employ some form of Time Division Duplexing (TDD) to schedule both Down Link (DL) and Up Link (UL) traffic. In a TDD environment, DL and UL communications occur between a cellular radio tower (tower) and wireless mobile devices within a geographic area covered by the tower that is referred to as a cell. DL communications from the tower to the wireless mobile devices occur during a first set of timeslots. Conversely, UL communications from the wireless mobile devices to the tower occur during a second, non-overlapping set of timeslots. The collection of timeslots for which a tower schedules radio resources for UL and DL communications describes the UL-DL configuration, or TDD configuration, for the tower and its corresponding cell.

Unfortunately, when differing, or asynchronous, UL-DL/TDD configurations are adopted at different transmission points within a WWAN, interference can become a problem. The DL transmission of one tower can interfere with the UL reception at another tower. Similarly, the UL transmissions of one wireless device can interfere with the DL reception at another wireless device. To avoid such interference, entire WWANs can operate synchronously, with a common UL-DL/TDD configuration.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
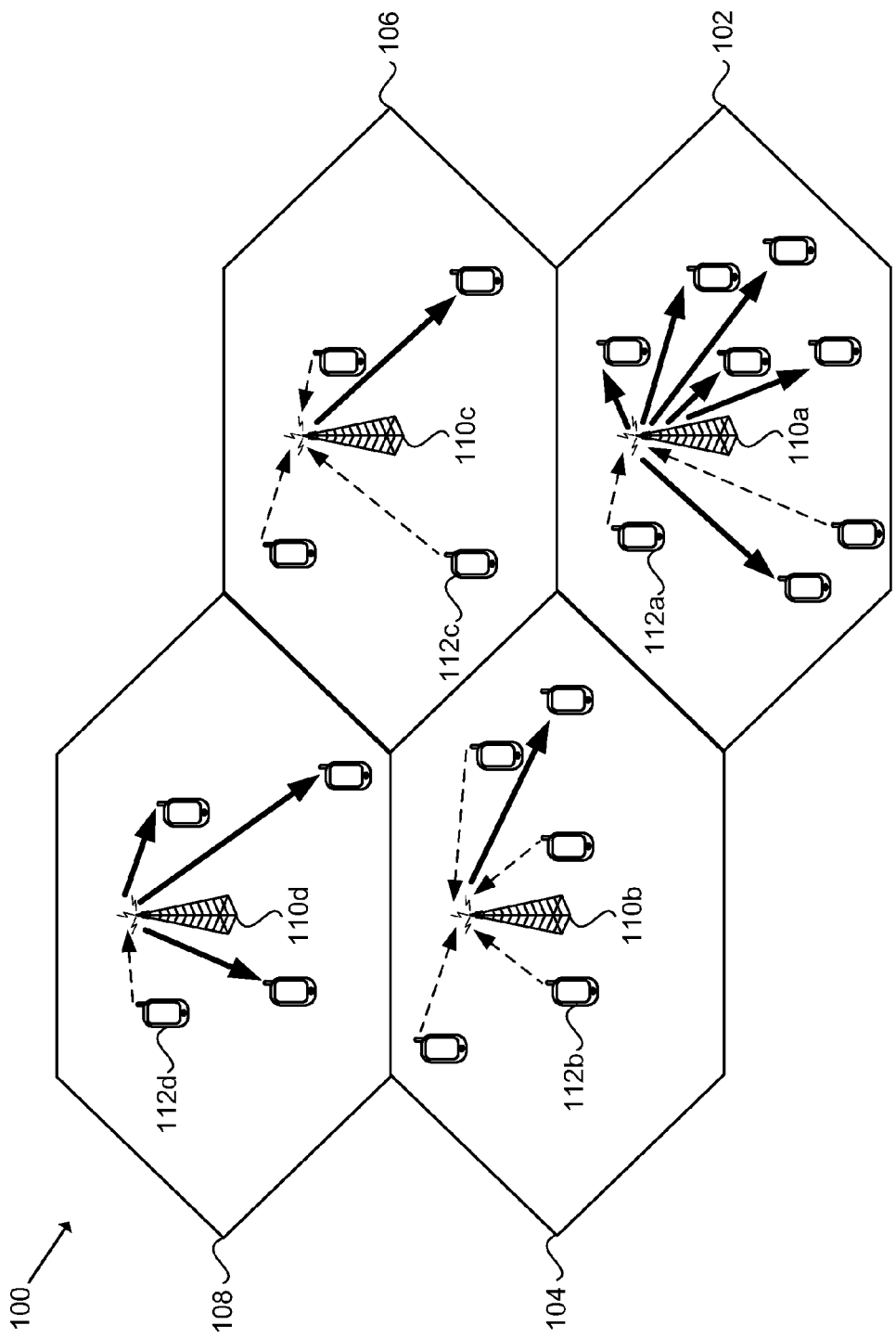
FIG. 1 is a block diagram illustrating a Wireless Wide Area Networks (WWAN) of evolved Node B (eNodeB) transmission points in an Evolved-Universal Terrestrial Radio Access (E-UTRAN) having coverage cells with asymmetric directional traffic in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

Different terminology for wireless devices is used in different specifications. As used herein, a wireless device is a device configured to wirelessly communicate with a cellular radio tower. Examples of wireless devices include, but are not limited to a User Equipment (UE) and a Mobile Station (MS). Throughout this application, the term UE can be used interchangeably with the term MS, or another form of wireless device.

As used herein a transmission point is a wireless communication device in a Wireless Wide Area Network (WWAN)

configured to communicate with a plurality of wireless devices located within a geographic region referred to as a cell. Different terminology for transmission points is used in different wireless specifications. Terminology used for different variations of a transmission point can include, but is not limited to, a Base Station (BS) and an evolved Node B (eNodeB or eNB). The terms are used interchangeably, unless otherwise noted. The actual definition of a BS or eNodeB is provided in the respective specifications, namely, Institute of Electrical and Electronics Engineers (IEEE) 802.16 and Third Generation Partnership Project (3GPP) Long Term Evolution (LTE) specifications.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term 'adjacent' can mean abutting, but can also mean sufficiently near that the interference between adjacent elements is a significant concern, regardless of any intervening elements.

Other terms may be defined elsewhere in the body of this specification.

Example Embodiments

With respect to such clustering approaches, an initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Within a Wireless Wide Area Network (WWAN) employing a form of Time Division Duplexing (TDD), many different possibilities exist for Up Link (UL)-Down Link (DL)/TDD configurations, with differing relative numbers of timeslots (resources) for UL and for DL transmission. These different combinations of UL and DL dedicated timeslots can allow a transmission point to adapt to different demands for traffic in a given cell. For example, where traffic within a cell creates a much greater demand for DL transmission, more DL timeslots can be scheduled for DL transmission.

However, a WWAN comprises a network that can include multiple transmission points, each covering a corresponding geographic region referred to as a cell. As is often the case, the demand for DL transmission time relative to the demand for UL transmission time, and vice versa, can vary, sometimes greatly, from cell to cell. Studies suggest that the ability to dynamically adapt to DL/UL traffic demands from cell to cell could improve the efficiencies of WWANs, greatly improving data throughput. Cells would not be locked into timeslots for directional traffic. Instead, one cell could have an UL-DL/TDD configuration different from its neighbor, allowing it to adapt to its own directional traffic needs. Yet, a common UL-DL/TDD configuration is currently applied across WWANs to avoid potential interference from adjacent transmission points scheduled for differing UL and DL transmission directions.

Although the WWANs can currently adapt to relative DL and UL traffic demands to form a homogeneous network, with each transmission point having the same TDD configuration, the superior efficiencies of adapting to such demands on a transmission point level can be difficult, due to the ensuing interference that can be caused by the differing configurations. However, heterogeneous deployments, where low power transmission points representing small cells operate at the same or different carrier frequencies relative to high power transmission points, have opened possibilities to adapt UL-DL configurations in small cells due to much higher isolation between those cells.

Differing directional traffic does not have the same impact between all transmission points. To determine the impact, measurements of potential interference, or coupling, between pairs of transmission points can be made. Where a high potential for interference is measured between a pair of transmission points, the pair of transmission points can be coupled in a common cluster. Where adjacent clusters share one or more common transmission points, they can also be merged into a common cluster. The common cluster can apply a common UL-DL/TDD configuration to avoid any potential interference between the transmission points in the common cluster.

However, where a low potential for interference exists for transmission points in a WWAN, the transmission points can be isolated in different clusters. At times, transmission points can be isolated as the single element in the cluster to which they belong. Since the potential for interference is low, different clusters can have different UL-DL/TDD configurations. As a result, UL-DL/TDD configurations can be assigned with a much improved level of granularity, paving the way for transmission points to independently adapt to changing directional traffic demands and for large improvements in the efficiency. Additional details are discussed below.

FIG. 1 illustrates a network of evolved Node B (eNodeB) transmission points in a Wireless Wide Area Network (WWAN) 100, which can be an Evolved-Universal Terrestrial Radio Access (E-UTRAN), having coverage cells with asymmetric directional traffic demands, or non-uniform cell loading. The WWAN comprises multiple different cells 102-108. Each cell is comprised of a geographic region over which the respective eNodeB 110a-110d is configured to communicate with wireless mobile devices 112a-112d. As an important statement of the generality of embodiments discussed in this disclosure, while the terminology of the 3GPP LTE standard is often used throughout this specification, it is not intended to be limiting, and there are exceptions in the use of more general terminology in portions of this specification to further communicate this point.

The eNodeBs 110a-110d of the various cells 102-108 are configured to support both Up Link (UL) and Down Link (DL) transmissions from and to one or more units of User Equipment (UE) 112a-112d within the various corresponding cells. To accommodate UL and DL transmissions, the WWAN 100 uses Time Division Duplexing (TDD) to separate transmissions from the eNodeBs to UEs, referred to as DL transmissions, and transmissions from the UEs to the eNodeBs, referred to as UL transmissions. TDD can be used to assign UL and DL transmissions to different timeslots. By assigning UL and DL transmissions to different timeslots, interference between the transmissions with differing directional traffic can be avoided. For instance, the interference may be caused by a relatively high power signal from a DL transmission that interferes with a lower power signal from an UL transmission (i.e. that has an opposite direction from the DL transmission within substantially the same time period).

Each cell 102-108 contains a number of arrows to and from various UEs 112a-112d located within each cell. The thin, dashed arrows pointing toward the eNodeBs 110a-110d represent an average amount of time spent in UL transmission for a given time. Similarly, the thick, solid arrows pointing away from the eNodeBs to the UEs represent an average amount of time spent in DL transmission for the given time. Therefore, the relative number of UL arrows to DL arrows depicts the relative amount of directional traffic demands, in terms of DL and UL transmissions, that each cell 102-108 experiences over the given amount of time.

Two of the cells depicted 102, 108 experience a markedly greater load of DL traffic relative to the two other cells depicted 104, 106. Over a given amount of time, each cell can experience different amounts of DL and UL directional traffic. Therefore, efficient use of temporal resources would dictate the use by each cell of a different amount of timeslots dedicated to UL transmissions and to DL transmissions. Throughout this application, the allocation of different numbers of timeslots to DL and UL directional traffic for a given amount of time is defined as an UL-DL configuration and/or a TDD configuration.

Figure 2:
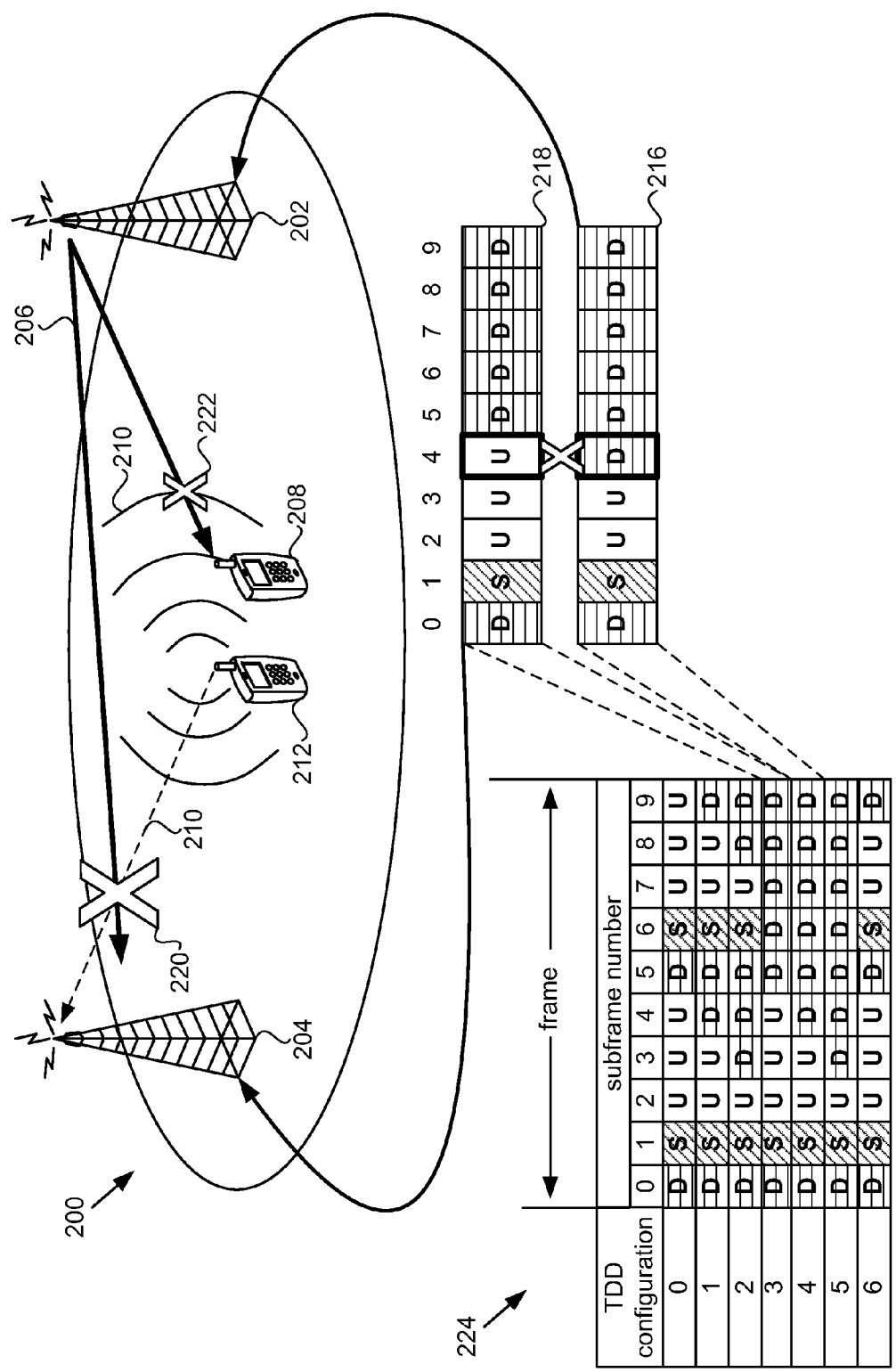
FIG. 2 is a block diagram illustrating two types of interference that can occur between cells with asynchronous Up Link (UL)-Down Link (DL)/Time Division Duplexing (TDD) configurations in accordance with an example.

FIG. 2 depicts two types of interference that can occur between cells with asynchronous UL-DL/TDD configurations. Within the figure, a wireless communication environment 200 is illustrated with a first eNodeB 202 and a second eNodeB 204 is shown. Although the first eNodeB and the second eNodeB are depicted as MaCro-Node (MCN) eNodeBs, depending on the embodiment, either the first eNodeB, the second eNodeB, or both can also be a Low Power Node (LPN). An LPN can comprise one of one of a micro cell, a pico cell, a femto cell, a home eNodeB cell (HeNB), a Remote Radio Head (RRH), a Remote Radio Equipment (RRE), a repeater, or another type of transmission point having a lower power than is typically used at a MCN. In this example, the first eNodeB 202 transmits a DL transmission 206 to a first UE 208 associated with the first eNodeB. The second eNodeB, however, is scheduled to receive an UL transmission 210 from a second UE 212 associated with the second eNodeB.

The direction of transmission between the first eNodeB 202 may differ from that of the second eNodeB 204 because the direction of transmission at the two eNodeBs is determined by different UL-DL/TDD configurations 216, 218. The direction of transmission for timeslots at the first eNodeB is determined by a first UL-DL/TDD configuration 216, whereas the direction of transmission for timeslots at the second eNodeB 218 is determined by a second UL-DL/TDD configuration.

The first and second UL-DL/TDD configurations 216, 218 are divided up into 10 different sub-frames (0-9). As used herein, a sub-frame corresponds to an amount of time, i.e., a time slot, for which a transmission point, such as an eNodeB, is scheduled for a single direction of traffic, whether UL or DL. In FIG. 2, at the fifth sub-frame (labeled sub-frame 4), the first eNodeB 202 is scheduled for downlink transmission according to the first UL-DL/TDD configuration 216. This is in conflict with the scheduling for UL reception at the fifth sub-frame (labeled sub-frame 4), according to the second UL-DUTDD configuration 218 of the second eNodeB 204. The conflict in the direction of transmission between the two eNodeBs sets the stage for two types of interference.

A first type of interference 220 is depicted with a large 'X' where the bold, solid arrow representing the DL transmission 206 from the first eNodeB 202 crosses the thin, dashed arrow representing the UL transmission 210 from the second UE 212 associated with the second eNodeB 204. (The UL transmission is also represented by the curved wave lines emanating from the second UE.) In this first type of interference, the DL transmission from the first eNodeB interferers with UL transmissions that the second eNodeB is scheduled to receive.

Since, the DL transmission 206 from the first eNodeB 202 interferes with the UL reception at the second eNodeB 204, this first type of interference 220 is referred to herein as transmission-point-to-transmission-point interference and/or eNodeB-to-eNodeB interference. Due to the power levels at which eNodeBs commonly transmit DL transmissions, this first type of interference can be the most problematic, as indicated by the large size of the 'X, in FIG. 2. Indeed, the received power of the useful signal from the second UE 212 can often be lower than the power of the interference from the DL transmission. This can make it difficult or impossible for the UL transmission to be received at the second eNodeB.

A second type of interference 222 is also depicted in FIG. 2 with a smaller 'X' where the curved wave lines emanating from the second UE 212 associated with UL transmission 210 from the second eNodeB 204 cross the bold, solid arrow representing the DL transmission 206 from the first eNodeB 202. (The UL transmission is also represented by the thin, dashed arrow.) This second type of interference arises from the interference caused by the UL transmission from the second UE with the DL transmission from the first eNodeB 202 as it is received by the first UE 208 associated with the first eNodeB.

Since, the UL transmission 210 from the second UE 212 interferes with the reception at the first UE 208 of the DL transmission 206 from the first eNodeB 202, this second type of interference is referred to herein as wireless-mobile-device-to-wireless-mobile-device interference and/or UE-to-UE interference. Since UEs commonly transmit at lower powers than eNodeBs, due to UL power control that compensates for pathloss propagation, in certain scenarios UE-to-UE interference can arise where a UE engaged in UL transmission, corresponding to the second UE in FIG. 2, is sufficiently close to a DL receiving UE, corresponding to the first UE in FIG. 2. Depending on the embodiment, such distances may be measured in tens to hundreds of meters. Therefore, UE-to-UE interference is depicted with a smaller 'X.'

The conflicts between transmission directions arising from the use of the first UL-DL/TDD configuration 216 and the second UL-DUTDD configuration 218 by two adjacent eNodeBs 202, 204 provide only some examples of instances where such conflicts can arise. Several other examples can be demonstrated from the table 224 of possible UL-DL/TDD configurations depicted in FIG. 2. The possibilities arising from the table are not intended to be limiting. A number of different UL-DL/TDD configurations may, or may not, be used that are not depicted in the table, depending on network configuration, network usage load, and other features, as can be appreciated. The table merely depicts UL-DL/TDD configurations specified for Release 9 of the Third Generation Partnership Project (3GPP) Long Term Evolution (LTE) standards. However, other approaches to UL-DL/TDD configurations are possible.

In the table 224, each configuration of the seven UL-DL/TDD configurations occupies a frame, which corresponds to 10 ms of transmission time. After the time required for frame transmission elapses, a chosen UL-DL/TDD configuration can be repeated, or a new one chosen. Each frame can comprise ten, 1 ms sub-frames. Each sub-frame can correspond to a timeslot.

Accordingly, each sub-frame can be allocated for either UL transmission, indicated in FIG. 2 with a 'U,' or DL transmission, indicated by a 'D.' Certain sub-frames can also be allocated for special transmission periods, indicated by an 'S,' such as those for Downlink Pilot Timeslot (DwPTS), Guard Period (GP), and Uplink Pilot Timeslot UpPTS transmissions. As can be appreciated, each UL-DL/TDD configuration corresponds to a different pattern of DL and UL transmission allocations with differing amounts of allocations for UL transmissions relative to DL transmissions. These differing patterns lead to the potential for interference between adjacent cells with eNodeBs with differing TDD configurations.

Figures 3A, 3B:
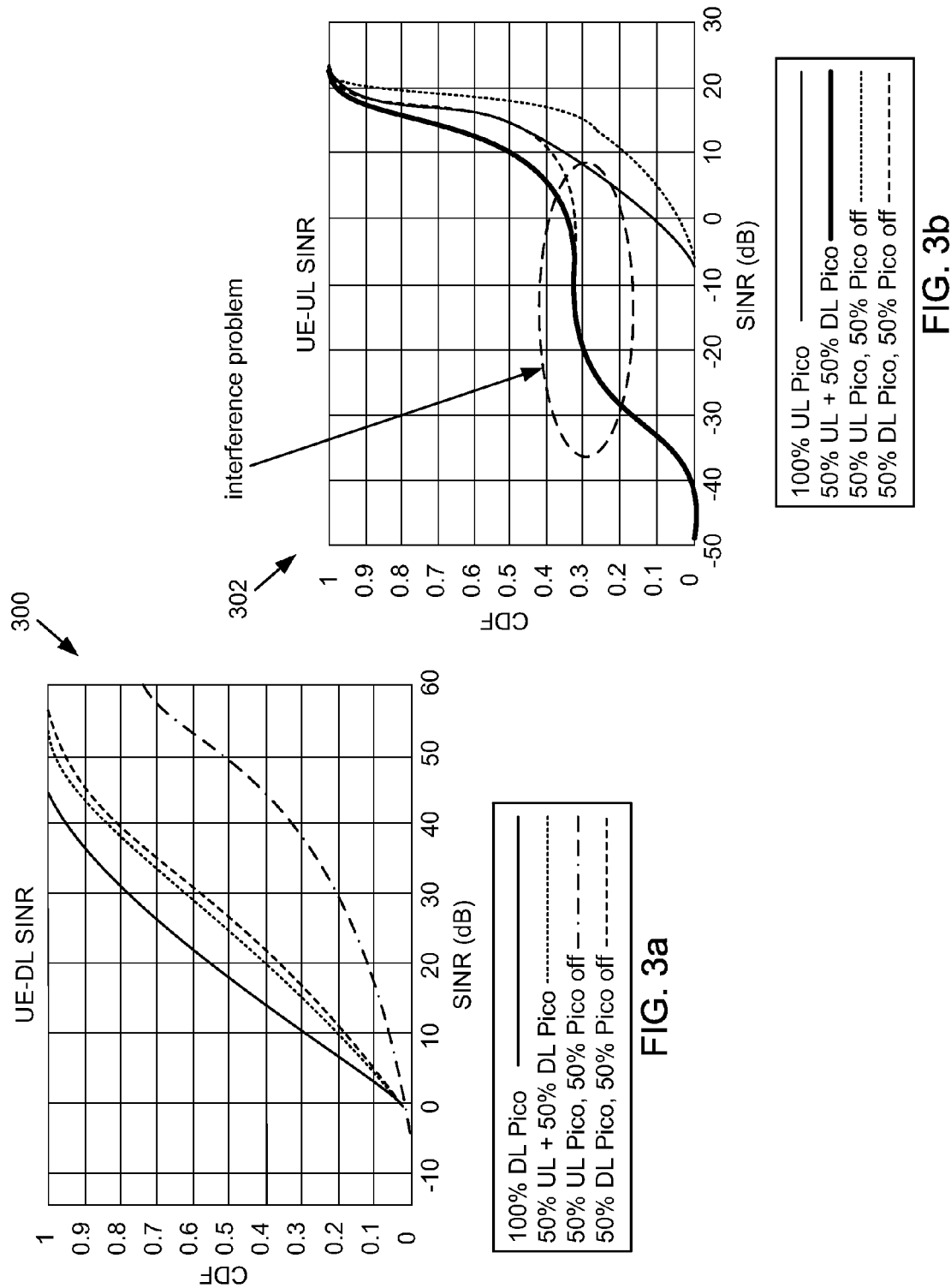
FIG. 3a is a chart depicting the Cumulative Distribution Function (CDF) of Signal to Interference and Noise Ratios (SINR) for DL reception at a UE for various levels of asynchronous transmission in accordance with an example.
FIG. 3b is a chart depicting the CDF of SINR for UL reception at an eNodeB for various levels of asynchronous transmission in accordance with an example.

FIG. 3a provides a chart 300 with the Cumulative Distribution Functions (CDF) of Signal to Interference and Noise Ratios (SINR) for DL reception at a UE where UE-to-UE interference is an issue. The CDFs provide results from a study performed by the 3GPP reported in R4-120837, "DL-UL interference analysis for single operator macro-outdoor pico deployment scenario in adjacent channel," INTEL CORP., February 2012. The CDFs result from simulations of different levels of conflicting transmission directions in a network with LPNs comprising pico cells.

The simulations involve four LPNs that are randomly distributed apart from one another. The CDF corresponding to the solid curve reports the case where all pico cells are engaged in DL transmission. The dotted curve corresponds to the CDF where half of the pico cells are engaged in UL transmission and half are engaged in DL transmission. The CDF corresponding to the dashed curve reports the case where half of the pico cells are engaged in DL transmission and half are turned off. Conversely, the CDF corresponding to the mixed, dashed-and-dotted curve reports the case where half of the pico cells are engaged in UL transmission and half are turned off.

In the FIG. 3a, SINR is measured at a UE that receives DL transmission from the LPN. Where all the LPNs are also engaged in DL transmission (solid curve), the DL transmissions from the LPNs interfere at the UE side. Therefore, the CDF for this scenario represents the lowest SINRs.

The SINR of the CDF, however, stays low even when half of the LPNs are switched from DL transmission to UL transmission (dotted line). The contribution of UE-to-UE interference can be seen when the scenario with 50% DL LPN transmission and 50% UL LPN transmission (dotted curve) is compared to the scenario with 50% DL LPN transmission and 50% of the LPNs turned off (dashed curve), for which SINR values in the corresponding CDF are slightly higher. The final CDF, for the scenario, with 50% UL LPN transmission and 50% of the LPNs turned off (mixed, dashed-and-dotted curve), corresponds to the highest values for SINR.

FIG. 3b provides CDFs 302 of SINR for UL reception at an eNodeB where eNodeB-to-eNode interference is an issue. The CDFs report results for the study performed by the 3GPP reported in R4-120837, as discussed above. As in FIG. 3a, reports of various CDFs with respect to SINR, measured in dB, are provided according to different levels of conflicting transmission directions in a network with LPNs comprising pico cells. As was also the case in FIG. 3a, four LPNs are randomly distributed apart from one another within the coverage area of an MCN eNodeB.

The CDF corresponding to the solid, bold curve reports the case where half of the pico cells are engaged in UL transmission and half are engaged in DL transmission. The dashed curve corresponds to the CDF where half of the pico cells are engaged in DL transmission and half are turned off. The CDF corresponding to the solid, plain curve reports the case where all pico cells are engaged in UL transmission. The dotted curve represents the CDF for the case where half of the pico cells are engaged in UL transmission and half are turned off.

The strong potential impact of eNodeB-to-eNodeB interference can be seen clearly in the various CDFs depicted in FIG. 3a. In the figure, SINR is measured at the eNodeB receiving UL transmission from a UE within the MCN's coverage area. A shelf spanning approximately 30 dB, circled by the dashed ellipse in FIG. 3b, corresponds to eNodeB-to-eNodeB interference problems for two of the scenarios reported with CDFs. As can be appreciate, this eNodeB-to-eNodeB interference 220, as explained in FIG. 2, can take the power associated with the useful signal below the power associated with noise and interference.

The CDFs manifesting eNodeB-to-eNodeB interference both involve scenarios where DL transmissions interfere with the UL transmission. The most pronounced interference arises in the scenario with 50% of the LPNs engaged in DL transmission and 50% engaged in UL transmission (solid, bold curve). The interference remains strong, albeit slightly reduced, for the scenario with 50% of the LPNs engaged in DL transmission and 50% are turned off (dashed curve), presumably reducing UL-to-UL interference.

However, much larger improvements in SINR are seen where none of the LPNs are engaged in DL transmission, potentially interfering with UL reception. Where all the LPNs are engaged in UL transmission (solid, plain curve), SINR greatly improves. The SINR is slightly better where 50% of the LPNs are engaged in UL transmissions and 50% of the LPNs are off (dotted line). Again, this additional improvement presumably results from reducing UL-to-UL interference by removing approximately half of the UL transmissions from UEs.

The problems of UE-to-UE and eNode-to-eNodeB interference arising where adjacent cells have differing transmission directions are significant. Therefore, a common UL-DL/TDD configuration is currently imposed across cellular networks to avoid differing transmission directions and the types of interference appointed therewith. However, this blanket approach results in large inefficiencies. This is because the need for UL transmission resources to DL transmission resources often varies greatly across such a network with respect to geographic region and with respect to time. If, therefore, interference problems could be mitigated so that one cell could have an UL-DL/TDD configuration different from its neighbors, timeslots for transmission directions could be used more efficiently to adopt to changing directional traffic loads in different regions of the network.

Figure 4:
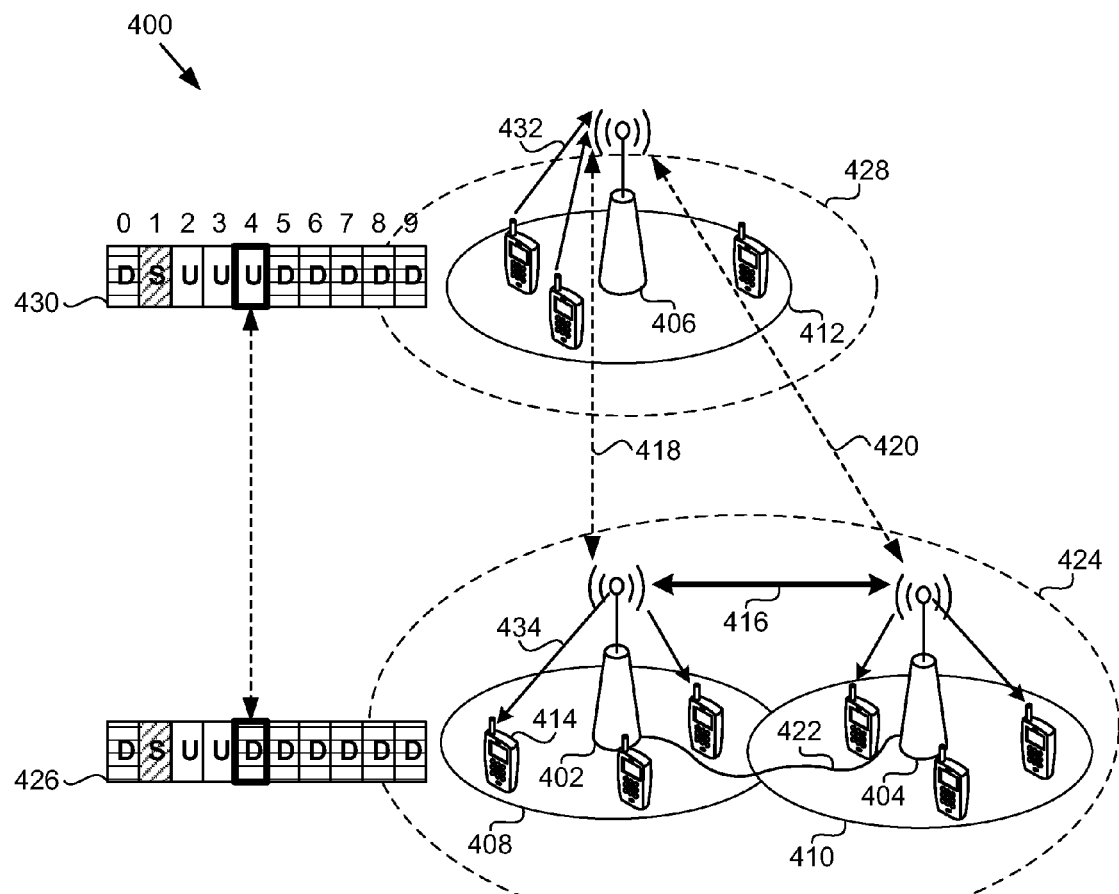
FIG. 4 is a block diagram illustrating the different levels of coupling interference that can result from asynchronous transmission depending on the pair of cells involved in asynchronous transmission based on asynchronous UL-DI/TDD configurations in accordance with an example.

FIG. 4 illustrates different levels of coupling interference that can result from asynchronous transmission. As used herein, the term coupling interference, coupling level, and/or interference level refers to a measurement of a DL transmission by one eNodeB/transmission point at another eNodeB/transmission point. The level of coupling interference that is measured can be indicative of the potential for eNodeB-to-eNodeB and UE-to-UE interference that differing transmission directions between the two eNodeBs can cause. As used herein, the term asynchronous traffic refers to differing directional transmission across transmission points within a WWAN 400. As shown in FIG. 4, the differing levels of coupling interference can be leveraged to improve the efficiency with which directional transmission timeslots are allocated within the WWAN in ways that allow different transmission points to adapt to differing directional traffic needs with respect to time and spatial region.

Three different eNodeBs, or transmission points, 402, 404, and 406, are depicted in FIG. 4. Although only three eNodeBs are depicted, any number of eNodeBs can be involved. Also, although the eNodeBs are depicted as LPNs, any combination of LPNs and MCNs are possible. The first eNodeB 402 in the example of FIG. 4 has a corresponding cell 408 defined by a coverage area 408 with multiple UEs therein. An example UE 414 is labeled to indicate the appearance of UEs in the figure. Similarly, the second eNodeB 404 also has a corresponding cell 410 defined by a coverage area with multiple UEs therein. Likewise, the third eNodeB 406 also has a corresponding cell 412 defined by a coverage area with multiple UEs therein.

As indicated by the solid, bold arrow, a relatively strong level of coupling interference 416 exists between the first eNodeB 402 and the second eNodeB 404. However, as indicated by the first dashed, thin arrow a relatively weak level of coupling interference 418 exists between the first eNodeB 402 and the third eNodeB 406. Additionally, as indicated by the second thin, dashed arrow, another relatively low level of coupling interference 420 also exists between the second eNodeB 404 and the third eNodeB 406.

To determine the level of coupling interference 416 between itself and the second eNodeB 404, the first eNodeB 402 can measure a unit of coupling information, make a coupling measurement, or determine a coupling level between the first eNodeB and the second eNodeB 404. The measurement can be based on DL transmission from the second eNodeB, such as the measurement of a pathgain from one or more reference signals in the DL transmission. Cell-specific reference signals, channel state information reference signals, or other signals can be used to measure pathgain. Based on such measurements, transmit power reduction can be applied between cells in order to reduce coupling and make those cells more isolated in the sense that opposite transmission direction does not deteriorate their performance.

Several other types of measurements are also possible, including, by way of illustration and without limitation, a measurement of received signal strength, a Reference Signal Received Power (RSRP) measurement, and a Reference Signal Received Quality (RSRQ) measurement. The RSRP and RSRQ measurements can be defined in one or more of the standards for Third Generation Partnership Project (3GPP) Long Term Evolution (LTE) Release 8, Release 9, Release 10 and Release 11. Throughout this application, Release 11 can refer to the prerelease issued by 3GPP LTE in the spring of 2012.

Once a unit of coupling information has been measured, a clustering determination can be made based on the measured unit of coupling information. Where the measured unit of coupling information indicates a high level of coupling interference 416 between the first eNodeB 402 and the second eNodeB 404, a determination can be made to cluster the first eNodeB and the second eNodeB for purposes of UL-DL/TDD configuration. Where the coupling information indicates a relatively low level of coupling interference, a determination can be made that the first eNodeB and the second eNodeB are sufficiently isolated to have different UL-DL/TDD configurations in the different clusters to which they below.

A determination on which transmission points can be clustered together to reduce undesirable levels of coupling interference and which transmission points can maintain a different TDD configuration, due to relatively low levels of coupling interference, can be made on the basis of one or more conditions being met. As an example a first condition can be that a performance of the first eNodeB is not substantially degraded by a transmission direction of an adjacent eNodeB. A second condition can be that a change of the transmission direction of the adjacent eNodeB does not substantially degrade the performance of the first eNodeB. Other conditions are possible. In some embodiments, substantial degradation can be identified relative to a selected coupling threshold level value.

A coupling threshold level can be determined by an estimate of a level of inter-cell interference calculated from the unit of coupling information where a transmission power of the adjacent eNodeB is known. In some embodiments, coupling interference can be determined based on an average power of a useful UL signal, measured in a time slot when UEs are scheduled for UL transmission to the measuring eNodeB. The cluster threshold can be determined based on an average level of UL measurements from multiple eNodeBs. Other approaches for selecting a coupling threshold level are also possible, as can be appreciated.

A determination that the first eNodeB 402 and the second eNodeB 404 can be isolated due to a relatively low level of coupling interference can result in configuring the first eNodeB with a first UL-DL/TDD configuration independent from a potentially differing UL-DL/TDD configuration for the second eNodeB. The ability to assign differing UL-DL/TDD configurations can increases the efficiency with which timeslots are scheduled for directional traffic. Conversely, where a determination has been made to cluster the first eNodeB and the second eNodeB 404, they can be configured with a common UL-DL/TDD configuration. The common UL-DL/TDD configuration can mitigate eNodeB-to-eNodeB and UE-to-UE interference where a measurement indicating a relatively high level of coupling indicates that these forms of interference could be a problem. Coordination of the common UL-DL/TDD configuration can occur over a backhaul link 422 between the first eNodeB and the second eNodeB. The backhaul link between the eNodeBs may be preexisting or established or modified on the basis of the determination. In certain embodiments, the coordination can be achieved over an X2 interface as defined in one or more of the standards for 3GPP LTE Release 8, Release 9, Release 10 and Release 11. Alternatively, if one eNodeB controls several cells, it can be implemented in a vendor-specific protocol.

Similar measurements can be made between additional eNodeBs within the WWAN 400, resulting in a number of different clusters, which can have anywhere from a single transmission point to many transmission points therein. Due to the relatively high level of coupling interference 416 in the example of FIG. 4, the first eNodeB 402 and the second eNodeB 404 are included in a common cluster 424. Both eNodeBs in the common cluster can be configured with a common UL-DL/TDD configuration 426 (corresponding to UL-DL/TDD configuration #3 in the table 224 provided in FIG. 2), for which additional eNodeBs could also be configured if they were assigned to the same cluster.

However, the third eNodeB 406 has relatively low coupling interferences 418, 420 between the third eNodeB and the first eNodeB 402 and the second eNodeB 402. Accordingly, the third eNodeB can be isolated in its own cluster 228. Since it is isolated in its own cluster, the third eNodeB can have a different UL-DL/TDD configuration, such as the different isolated UL-DL/TDD configuration 430 (corresponding to UL-DL/TDD configuration #4 in the table 224 provided in FIG. 2) for the isolated cluster depicted in FIG. 4.

Due to the differing UL-DL/TDD configurations 426, 430 in FIG. 4, at the fifth timeslot/sub-frame (indicated by number 4), the UEs within the third coverage area 412 corresponding to the isolated cluster 428 are engaged in UL transmission 432. At the same time, the first eNodeB 402 and the second eNodeB 404 within the first coverage area 408 and the second coverage area 412 respectively of the common cluster 418 are engaged in DL transmission 434. Hence, the differing directional transmission traffic demands within the two clusters can be efficiently accommodated with differing UL-DL/TDD configurations without leading to unacceptable eNodeB-to-eNodeB and UE-to-UE interference problems. Additionally, these UL-DUTDD configurations 426, 430 can be changed independently in near real time to adapt to changing directional traffic demands within the two clusters that can be constantly monitored.

Figure 5:
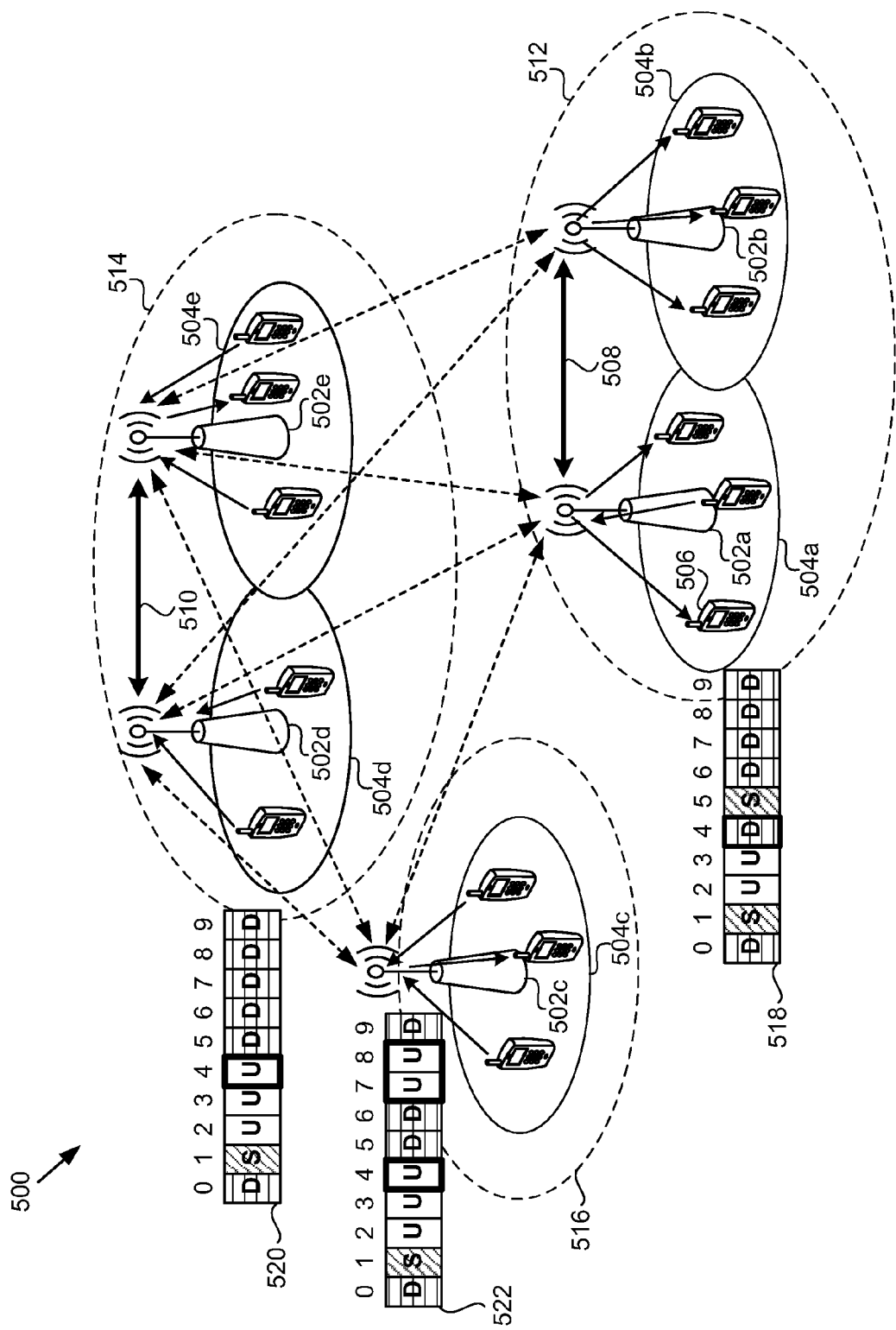
FIG. 5 is a block diagram illustrating the formation of different clusters of eNodeBs to reflect the different interference impacts that can result between different eNodeBs engaged in asynchronous transmission based on asynchronous UL-DL/TDD configurations in accordance with an example.

FIG. 5 depicts the formation of multiple clusters based on coupling levels between transmission points. Throughout this application, the term 'coupling level' refers to a measurement of potential interference. Several, non-limiting examples of such measurements have been provided previously. Five different LPN eNodeBs 502a-e with their corresponding coverage areas 504a-e are depicted in FIG. 5. However, any number of eNodeBs and combinations of LPNs and MCNs are possible. Additionally, a coupling level between each pair of eNodeBs is also depicted. Coupling levels above a coupling threshold are depicted by solid, bold arrows 508, 510. Coupling levels that are not above the coupling threshold are depicted as thin, dashed arrows. The coupling threshold is set at a predetermined level at which the potential for eNodeB-to-eNodeB and UE-to-UE interference can begin to be a problem, with some possible considerations discussed previously.

The two coupling levels above a coupling threshold 508, 510 can be the basis for forming a first cluster 512 with the first eNodeB 502a and the second eNodeB 502b and a second cluster 514 with the fourth eNodeB 502d and the fifth eNodeB 502e. Since there is no coupling level above the coupling threshold between the third eNodeB 502c and any other eNodeB, a third cluster 516, with a single eNodeB, can be formed. Each cluster can have a different UL-DL/TDD configuration, as indicated by the first UL-DL/TDD configuration 518 (corresponding to UL-DUTDD configuration #4 in the table 224 provided in FIG. 2) for the first cluster 512, the second UL-DL/TDD configuration 520 (corresponding to UL-DUTDD configuration #3 in the table 224 provided in FIG. 2), for the second cluster 514, and the third UL-DL/TDD configuration 522 (corresponding to UL-DUTDD configuration #6 in the table 224 provided in FIG. 2), for the third cluster 516.

The three clusters are depicted at the fifth timeslot/subframe (labeled #4), where potential conflicts in directional traffic exist, but interference problems are mitigated by the formation of different clusters. Potential conflicts also exist on the eighth and ninth sub-frames (labeled #7 and #8 respectively). As can be appreciated from the various arrows between UEs and eNodeBs, the formation of several different clusters allows the WWAN 500 to adapt in near real time to differing directional transmission traffic loads within the different clusters. Differing traffic loads are depicted by differing numbers of arrows from UEs to eNodeBs and from eNodeBs to UEs depicting differing relative demands for UL and DL transmissions respectively. An example UE 506 is labeled to indicate the appearance of additional UEs in the figure. As can be appreciated, the various UL-DL/TDD configurations 518, 520, and 522 are tailored to meet these demands for UL and DL transmissions.

To facilitate the determination of UL-DL/TDD configurations 518, 520, and 522, eNodeBs can communicate their directional traffic needs between one another over low-latency backhaul infrastructure. Individual eNodeBs within a cluster can be configured to send traffic direction information about traffic direction needs and receive such traffic direction information. Decisions about a common UL-DUTDD configuration or a restricted set of UL-DL configurations for a cluster 512, 514, and 516 can be made on the basis of joint UL and DL needs throughout the cluster and/or splitting differences between UL and DL traffic demands at individual eNodeBs in the cluster.

Decisions about UL-DL/TDD configurations can be made at individual eNodeBs and/or at a network level. Where determinations are made at a network level, information used to make such determinations can be communicated to the network level over an S1 interface, as described in any combination of Release 8, Release 9, Release 10, and Release 11 of the 3GPP LTE specifications. Determinations for UL-DL/TDD configurations for different clusters can be constantly made and updated independent of one another to respond to dynamically changing directional traffic loads monitored within individual clusters.

Figure 6:
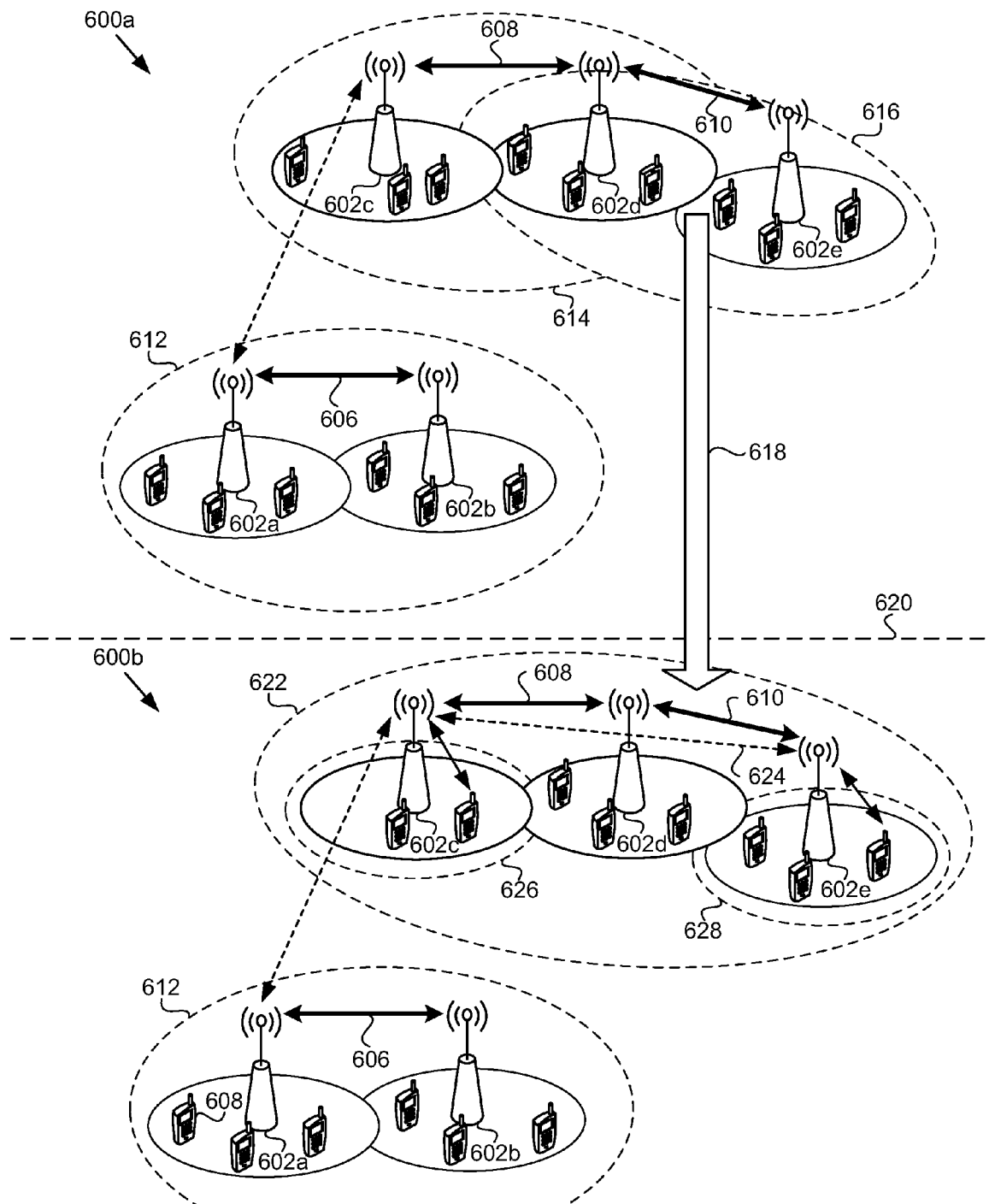
FIG. 6 is a block diagram illustrating the formation of a sub-cluster and the merging of different clusters of eNodeBs to reflect the different interference impacts that can result between different eNodeBs engaged in asynchronous transmission in accordance with an example.

FIG. 6 illustrates the merger of clusters to form a larger cluster, with potential sub-clusters. As before, several different LPN eNodeBs 602a-e, which can represent any number of eNodeBs and combinations of LPNs and MCNs, with their corresponding coverage areas are depicted in FIG. 6. Additionally, coupling levels between pairs of eNodeBs are also depicted, where solid, bold arrows 604, 606, 608, represent coupling levels above a coupling threshold and thin, dashed arrows represent coupling levels that are not above the coupling threshold.

Based on the three coupling levels 604, 606, 608 above the coupling threshold, three clusters can be formed: a first cluster 612 between the first eNodeB 602a and the second eNodeB 602b; a second cluster 614 between the third eNodeB 602c and the fourth eNodeB 602d; and, a fifth cluster 616 between the fourth eNodeB 602d and the fifth eNodeB 602e. As can be appreciated, however, the second cluster and the third cluster share a common eNodeB, the fourth eNodeB 602d. Therefore, to avoid potential eNodeB-to-eNodeB interference, the second and third clusters can be merged 618.

The action of merging 618 the second cluster 614 and the third cluster 616 results in a different prior clustering configuration 600a before accomplishment of the merger 620 with respect to a post clustering arrangement 600b afterward. After accomplishment of the merger, only a small cluster 612 and a large cluster 622 remain. In certain embodiments, by way of illustration and not limitation, a merger determination can be made in response to an eNodeB list communicated over backhaul infrastructure, such as an X2 interface and an S1 interface, from one or more adjacent clusters. The eNodeB list can include a list of eNodeBs within a cluster such that the presence of one or more common/intersection eNodeBs between clusters can be determined. Where one or more common/intersection eNodeBs are present between clusters, a determination to merge clusters can be made. Where there are not one or more common/intersection eNodeBs present, a determination to leave the clusters unaltered may be made, depending on potential coupling threshold level values.

The merger process can also be performed in reverse. Where one or more common eNodeBs no longer connects portions of a larger cluster, according to an updated measurement, the larger cluster can be divided into smaller clusters. Conversely, where the one or more previously common eNodeBs again become active in ways that justify reconnecting the larger cluster, the cluster should be reformed.

Additionally, in certain embodiments, a potential for sub-clustering can be capitalized upon. Although both the third eNodeB 602c and the fifth eNodeB 602e share coupling levels 608, 610 above a coupling threshold with the fourth eNodeB 602e, another coupling level 624 between the third and fifth eNodeBs is below the coupling threshold, as indicated by the thin, dashed arrow. Since the fourth eNodeB 602d is still shared in common, the third and fourth eNodeBs belong to the same cluster 622. However, due to the low coupling level between the third and the fifth eNodeBs, small variations can be appropriate in the configurations of the third and fifth eNodeBs for different scenarios.

One such scenario, provided by way of illustration and not limitation, can include a scenario where the forth eNodeB 602d is scheduled to transmit an Almost Blank Sub-frame (ABS). Other non-limiting scenarios include scenarios where the fourth eNodeB is configured to engage in beam forming and/or power reduction during certain timeslots/sub-frames. During such timeslots and sub-frames the third eNodeB 602c and the fifth eNodeB 602e can engage in transmissions with conflicting directions, because of the relatively low coupling level 624 between them. Therefore, the merged, larger cluster 624 can be divided into sub-clusters, which can have different UL-DL/TDD configurations on sub-frames for scenarios similar to those described above. FIG. 6 depicts such sub-clusters in terms of a first sub-cluster 626 for the third eNodeB and a second sub-cluster 628 for the fourth eNodeB. Although the sub-clusters in FIG. 6 only comprise one eNodeB, multiple eNodeB within a single sub-cluster are also possible.

Figure 7:
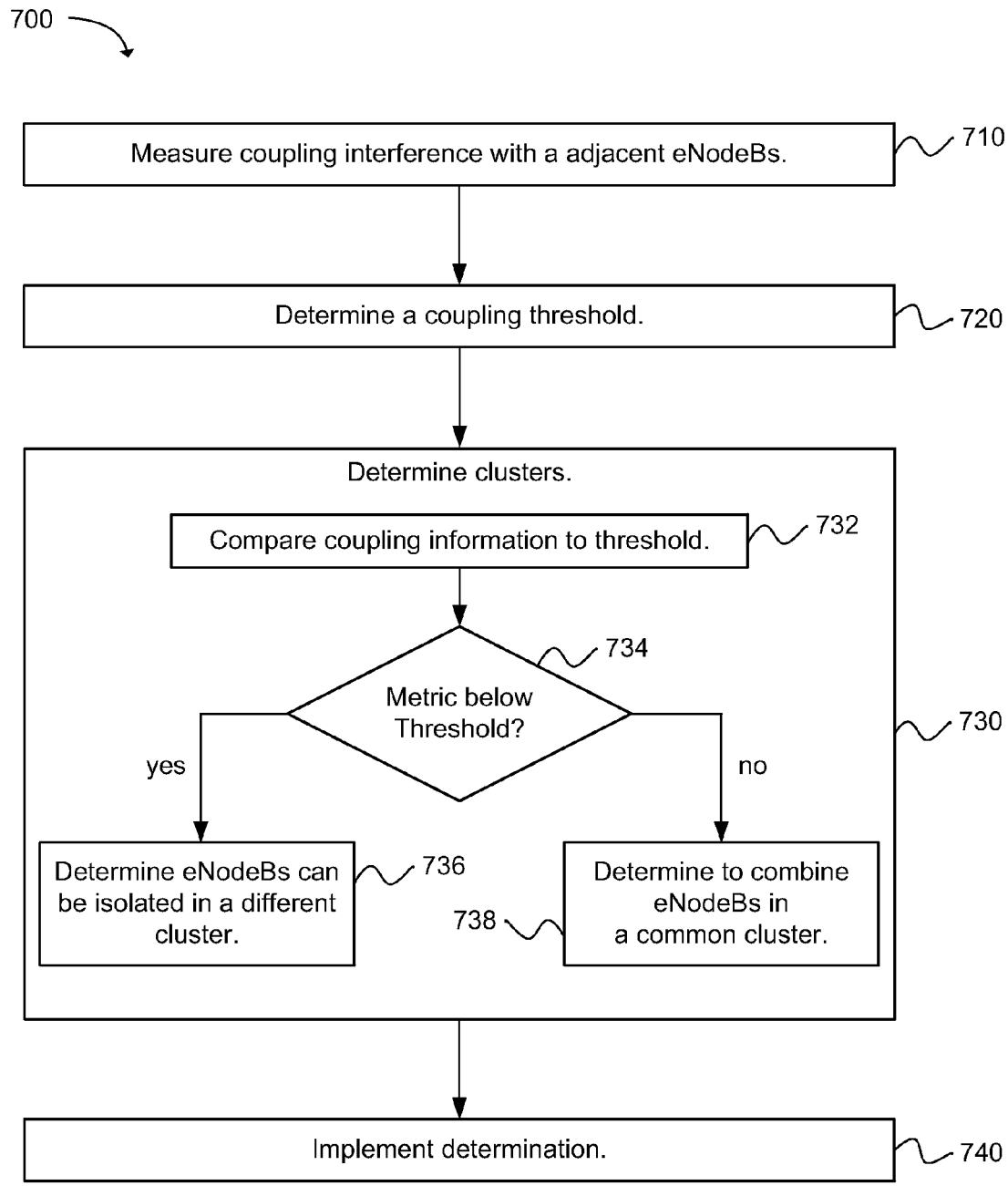
FIG. 7 is a flowchart depicting a process for cluster formation, merger, and eNodeB isolation to accommodate adaptive, asynchronous directional transmissions within a WWAN in accordance with another example.

FIG. 7 provides a flowchart depicting a process 700 for cluster formation consistent with one example. The process comprises measuring 710 a unit of coupling information between two transmission points/eNodeBs. The coupling measurement can be made on one eNodeB based on a portion of a DL transmission from an adjacent eNodeB. The coupling information can take any of the forms described above in addition to metrics apparent to those of ordinary skill in the art. A coupling threshold is then determined 720. In one example provided for purposes of illustration, not limitation, the coupling threshold can be determined based on a useful signal power estimate generated from measurements of UL transmissions from eNodeBs within the coverage area of a particular eNodeB. In other embodiments, a coupling threshold value is received over a backhaul link, or retrieved from memory. However, other approaches are discussed in this specification and will be apparent to those of ordinary skill in the art.

The process 700 continues by making a clustering determination 730. The step of making a clustering determination can be broken out into a sub-routine 730 involving comparing 732 the unit of coupling information to the coupling threshold. Within the sub-routine, a decision 734 can then be made as to whether a coupling metric related to the coupling information, such as a pathgain in one non-limiting example, is below a coupling threshold. If the answer is yes, a determination 736 is made that the measuring eNodeB can be isolated 736 in a different cluster from the adjacent eNodeB. Where the answer is no, a determination 738 can be made that the pair of eNodeBs can be combined in a common cluster.

After the isolation decision 734, the clustering determination sub-routine 730 is complete. The method 700 then continues by carrying out 740 one of the determinations 736, 738, as indicated by the determination sub-routine, making sure the measuring eNodeB and the adjacent eNodeB are in the right cluster or clusters relative to one another. The process can then continue for another pair of eNodeBs in a WWAN.

Figure 8:
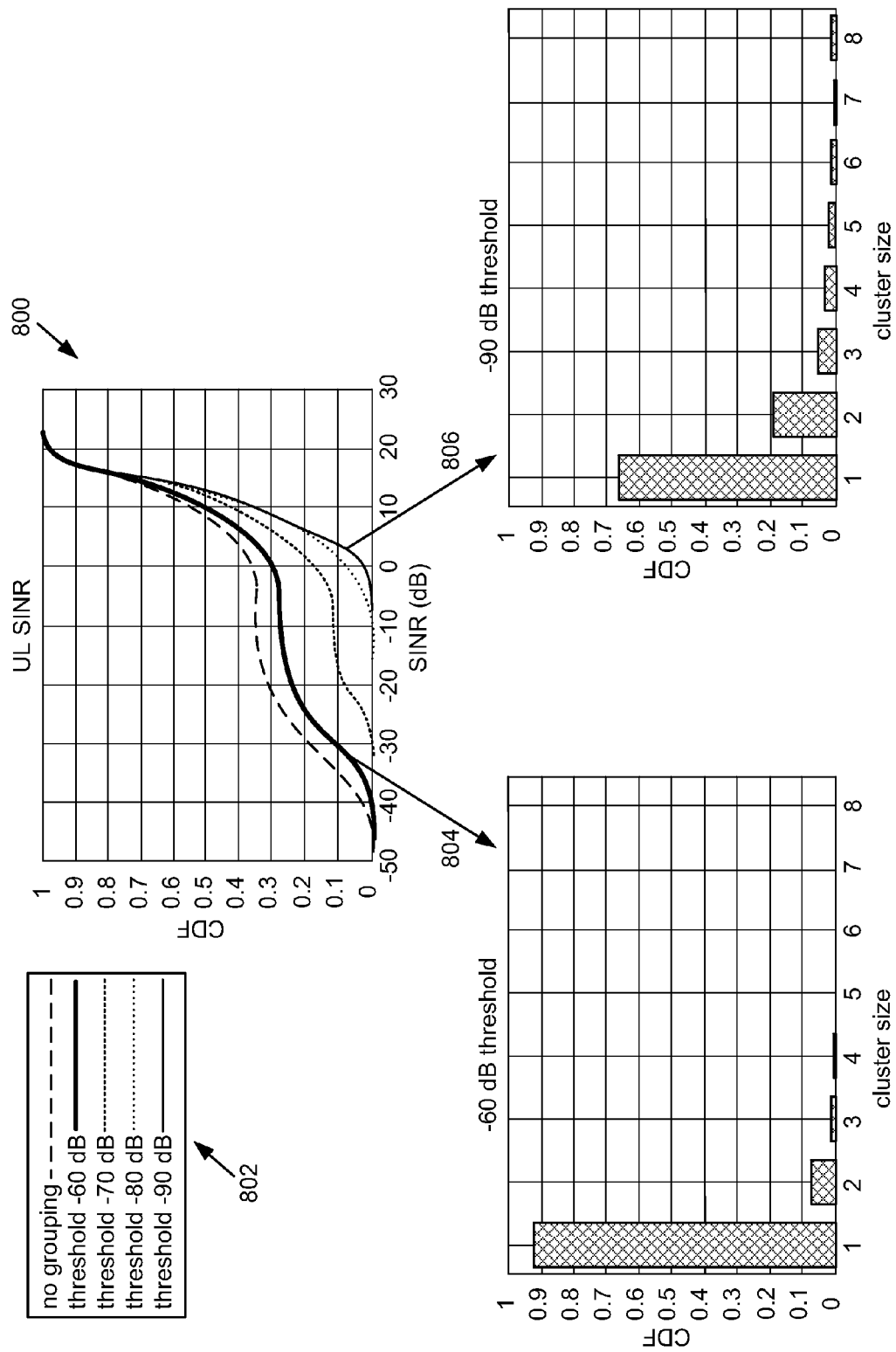
FIG. 8 is a chart depicting the CDF of SINR for UL reception at an eNodeB for various cluster interference levels with two additional graphs depicting the CDF for cluster sizes for cluster interference levels of −60 dB and −90 dB, in accordance with an example.

FIG. 8 provides a chart 800 illustrating a tradeoff between improvements to SINR resulting from clustering and directional traffic adaptation capabilities. In the chart, the CDFs with respect to SINR, measured in dBs, are provided for a study of several different coupling thresholds. These CDFs report SINR for a scenario similar to the one described above in FIG. 3b, but for which more LPNs, comprising pico cells, are distributed in the coverage area of a MCN where SINR of UL transmissions from a UE in the coverage area are measured. Also, instead of directional traffic being set at a granularity of individual LPNs, transmission direction is determined for entire clusters.

The chart 800 reports the study results for a scenario where 50% of the LPNs are engaged in UL transmission and 50% of the clusters are engaged in DL transmission. As indicated in the table of threshold values 802, the CDF with respect to SINR is reported for various coupling thresholds in the table. The coupling threshold can, as discussed above, determine whether one transmission point can be isolated from another so that it can independently adapt to the directional traffic needs within its coverage area.

Where a coupling metric from a measured unit is above the coupling threshold, eNodeB-to-eNodeB interference, and/or UE-to-UE interference can be deemed to be sufficiently great not to allow the pair of eNodeBs for which the measurement was made to be isolated in different clusters with different directional traffic. Conversely, where the coupling metric for a coupling measurement is below the coupling threshold, the pair of eNodeBs can be allowed to adapt independently to the directional traffic loads which they experience. Therefore, the determination of the coupling threshold can involve a tradeoff between traffic adaption, associated with many clusters and small numbers of eNodeBs therein, and avoiding eNodeB-to-eNodeB interference, and/or UR-to-UR interference. This tradeoff is demonstrated in the chart 800 and its accompanying graphs 804, 806.

Table 802 indicates that the long-dashed curve reports the CDF with respect to SINR for the scenario where no clustering is allowed. (This scenario is similar to the scenario depicted by the bold, solid curve in FIG. 3b.) The solid, bold cure depicts the results for the highest coupling threshold value of −60 dB, which refers to a value for a measured path gain. However, other coupling metrics are possible in alternative embodiments. Results are also reported for coupling thresholds of −70 dB (short-dashed curve), −80 dB (dotted curve), and −90 dB (solid curve), which is the lowest coupling threshold value.

A CDF of cluster size, in terms of eNodeBs in a given cluster, is provided in a first graph 804 for the highest clustering threshold of −60 dB. A second graph 806 provides the CDF for the lowest clustering threshold of −90 dB. A raised clustering threshold allows more eNodeBs to be isolated from one another in more clusters of smaller sizes. Hence, the first graph for the highest clustering threshold reports a CDF with over 90% of clusters including a single eNodeB. Almost each transmission point, therefore, would be allowed to independently adapt to the directional traffic demands placed upon it. However, the relatively high value for the coupling threshold, as indicated by the chart 800 does not do much to improve SINR, meaning the eNodeB-to-eNodeB interference and/or UE-to-UE interference can be problems.

At the other extreme, a coupling threshold of −90 dB prevents more eNodeB-to-eNodeB interference and/or UE-to-UE interference, placing a greater restriction on transmission points that can have different directional traffic. As a result, chart 800 indicates that SINR is greatly improved. However, the second graph 806 corresponding to this low coupling threshold shows that fewer clusters are formed and those clusters tend to have more eNodeBs within them. For example, only about 65% of transmission points are able to independently adapt to directional traffic demands, making the network as a whole less capable of adapting to these demands.

As demonstrated by FIG. 8, therefore, the coupling threshold is an optimization parameter. The optimization parameter can be optimized for a particular WWAN in terms of competing needs to avoid eNodeB-to-eNodeB interference and/or UE-to-UE interference on one side and to adapt to directional traffic demands on the other side. In some embodiments such optimization can be automated based on feedback. Such feedback can include, by way of example and not limitation, feedback about throughput, a pathgain measurement, SINR, directional traffic loading at one or more transmission points, and/or one or more coupling levels.

Figure 9:
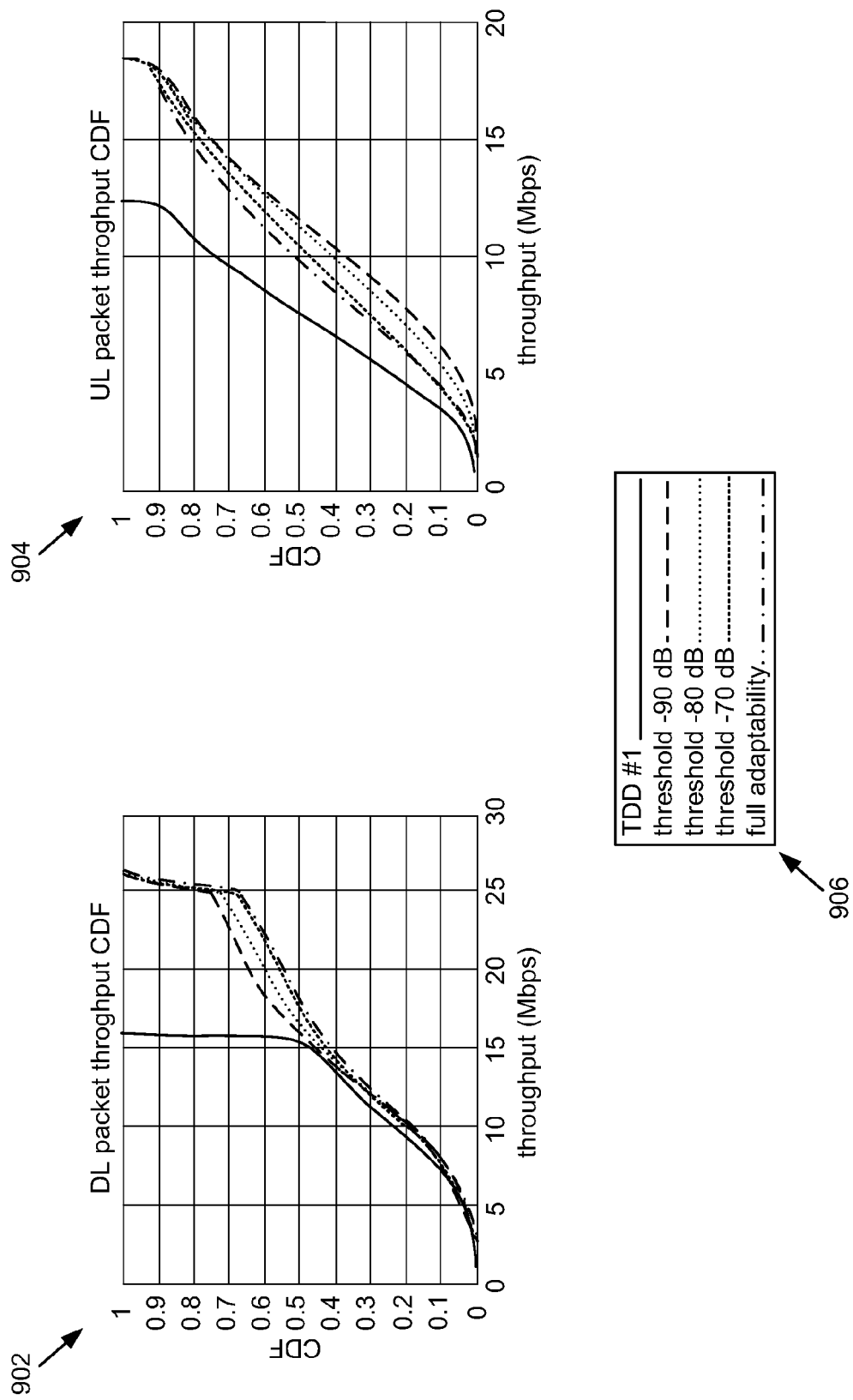
FIG. 9 is a pair of charts depicting the CDFs for DL and UL packet throughput for various cluster interference levels in accordance with an example.

FIG. 9 provides a pair of charts 902, 904 demonstrating the improvements in DL and UL throughputs that clustering achieves. The first chart 902 provides several CDFs, corresponding to various coupling thresholds, plotted with respect to packet throughput, in Mega bits per second (Mbps), received at a UE during DL transmission from a transmission point. Conversely, the second chart 904 provides several CDFs for the same coupling thresholds, plotted with respect to packet throughput, in Mbps, received at a transmission point from a UE during UL transmission. The various threshold values for the various CDF curves in both charts are provided in the threshold table 906.

The CDFs plotted in the charts 902, 904 report simulations similar to those discussed above with respect to FIG. 3 and FIG. 8. The simulation is conducted using File Transfer Protocol (FTP) traffic model parameters defined in 3GPP R1-120080, where $\lambda_D = \lambda_u = 1$, FTP file size=0.5 MB, and time scales=10 ms. As indicated in the threshold table 906, the solid curve reports the case where UL-DUTDD configurations are changed semi-statically, measured in minutes and hours, across the network in accordance to existing TDD technologies.

The long-dashed curves depict the results for a coupling threshold of −90 dB, which refers to a value for a measured path gain. However, other coupling metrics are possible in alternative embodiments. Results are also reported for coupling thresholds of −80 dB (dotted curve), and −70 dB (short-dashed curve). A mixed, dashed-and-dotted curve is provided to indicate what the CDFs for packet throughput would be in a hypothetical case if each transmission point could adapt independently to directional traffic needs without worrying about interference.

As can be appreciated, the packet throughputs are increased by almost 10 Mbps for the DL reception at a UE and by more than 5 Mbps at the UL reception at the transmission point. Therefore, the proposed approaches to interference management can be used to resolve the eNodeB-to-eNodeB interference and/or UE-to-UE interference problems. Furthermore, the proposed solutions are applicable for different types of deployment scenarios.

Figure 10:
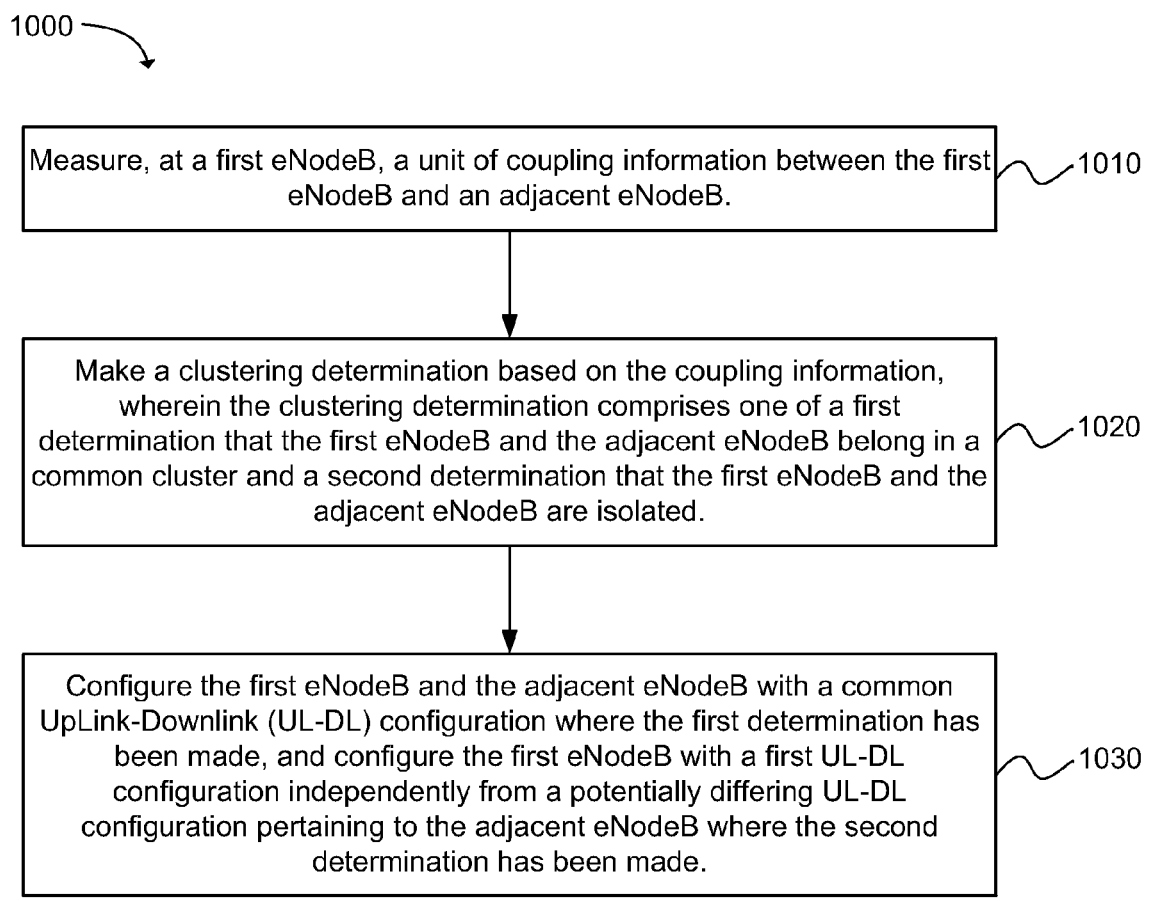
FIG. 10 is a flowchart depicting a clustering process to accommodate adaptive, asynchronous directional transmissions within a WWAN in accordance with an example.

FIG. 10 depicts a flowchart for a particular clustering method 1000 for interference management in a wireless network with different UL and DL time timeslots and adaptive, asynchronous directional traffic resource allocation consistent with an example. The method can, but need not necessarily, be embedded in a computer program product comprising a non-transitory computer usable medium. The computer readable medium can have a computer readable program code embodied therein. The computer readable program code can be adapted to be executed to implement instructions for the method.

The method comprises measuring 1010, at a first eNodeB, a unit of coupling information between the first eNodeB and an adjacent eNodeB. The unit of coupling information is used to make a clustering determination. The clustering determination, as depicted in block 1020, can be a first determination that the first eNodeB and the adjacent eNodeB belong in a common cluster. Conversely, the clustering determination can be a second determination that the first eNodeB and the adjacent eNodeB are isolated, meaning they can be in different clusters. Where the first determination has been made, the method 1000 further comprises configuring 1030 the first eNodeB and the adjacent eNodeB with a common UL-DL configuration. Where the second determination has been made, the method further comprises configuring 1030 the first eNodeB with a first UL-DL configuration independently from a potentially differing UL-DL configuration pertaining to the adjacent eNodeB.

In certain embodiments, making the clustering determination, based on the unit of coupling information, further comprises reaching the first determination where at least one of a first condition and a second condition is met. The first condition is that a performance of the first eNodeB is not substantially degraded by a transmission direction of the adjacent eNodeB. The second condition is that a change of the transmission direction of the adjacent eNodeB does not substantially degrade the performance of the first eNodeB. If the right combination of these two conditions is not met, the second determination is reached.

In some embodiments, a coupling metric is selected to characterize the unit of coupling information. A coupling threshold is also used to determine that the performance of the first eNodeB is substantially degraded where the unit of coupling information is either at or above the coupling threshold for the coupling metric. Otherwise, a determination is made that the first eNodeB is not substantially degraded where the unit of coupling information is below the coupling threshold for the coupling metric.

Such embodiments can further comprise determining the coupling threshold based on one of several different possibilities. One example of such a possibility is an estimate of a level of inter-cell interference calculated from the unit of coupling information where a transmission power of the adjacent eNodeB is known. Another example is an average power of a useful UL signal. Yet another example is an average level of uplink inter-cell interference where all eNodeBs in the common cluster operate to receive uplink transmission.

Certain embodiments can comprise merging the common cluster with a second cluster. The clusters are merged in such embodiments where the common cluster and the second cluster have at least one eNodeB in common. This one or more eNodeBs couple the common and adjacent clusters. Similarly, certain embodiments can comprise dividing a merged cluster into sub-clusters. This division can take place where one or more adapted eNodeBs within the merged cluster can adapt to changing traffic demands in a manner such that the following scenario is met. The scenario is that the first condition and the second condition, as discussed above, no longer obtain between the one or more adapted eNodeBs and one or more additional eNodeBs in the merged cluster. When this scenario is met, each sub-cluster can apply a different UL-DL configuration.

The method 1000 can further comprise adapting a UL-DL configuration in substantially real-time to changing uplink and downlink traffic demands at any of the first eNodeB and the adjacent eNodeB. The adapted UL-DL configuration can pertain to the common UL-DL configuration where the first determination, discussed above, has been made. The changing uplink and downlink traffic demands can be communicated between eNodeBs in the common cluster over a low-latency backhaul infrastructure. Alternatively, the adapted UL-DL configuration can pertain to the he first TDD configuration where the second determination, discussed above, has been made.

The method 1000 can also further comprise communicating at least one of UL and DL traffic needs between the first eNodeB and the adjacent eNodeB in the common cluster over a low-latency backhaul infrastructure. In some embodiments, the method can further comprise determining at least one of the common UL-DL configuration and a restricted set of UL-DL configurations for the common UL-DL configuration. This determination can be made on the basis of at least one of joint UL and DL needs throughout the common cluster. The determination can also be made by splitting a difference between UL and DL traffic demands at the first eNodeB and the adjacent eNodeB in the common cluster.

Figure 11:
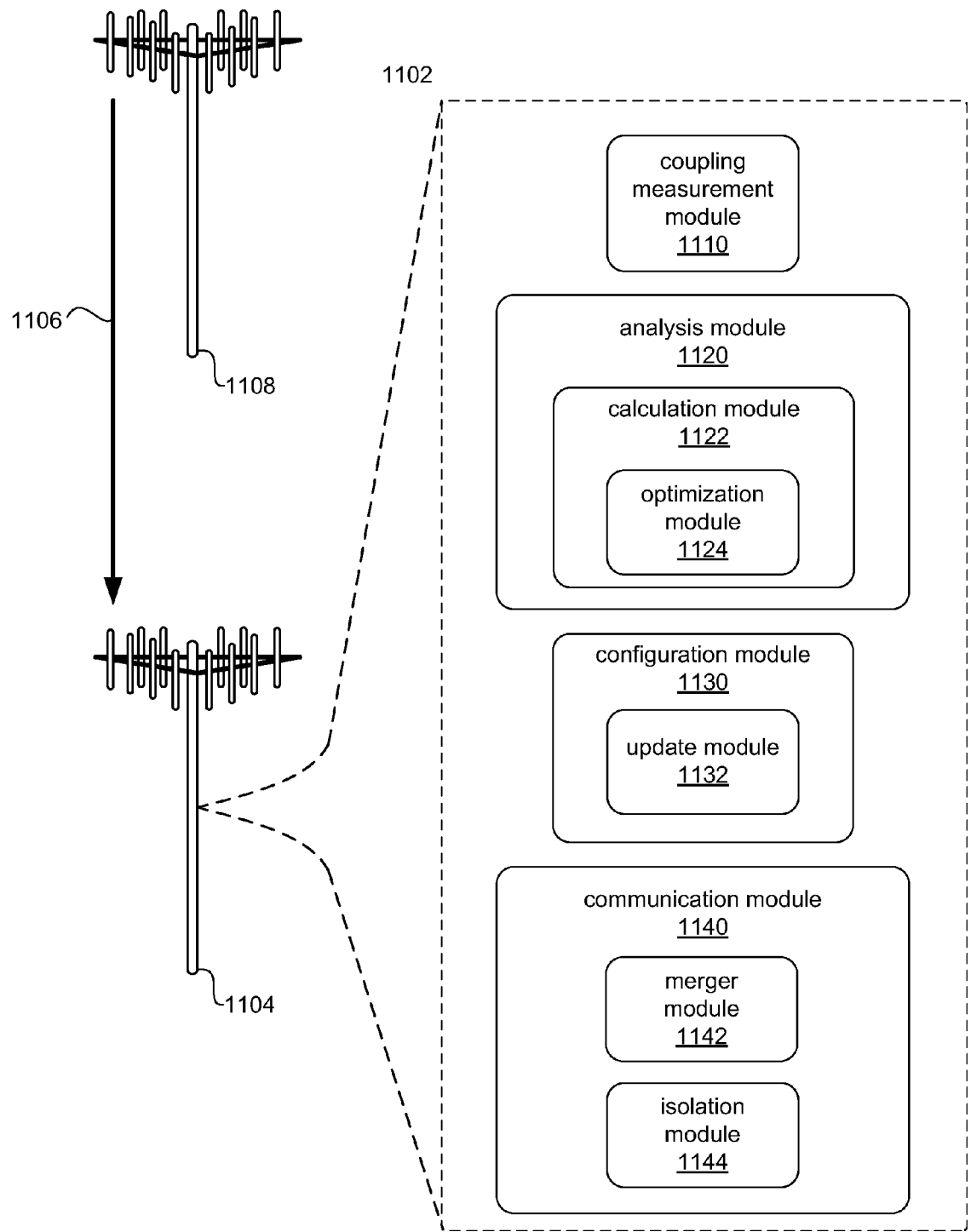
FIG. 11 is a block diagram illustrating a device operating at an eNodeB to perform measurement and other functions to form clusters allowing adaptive, asynchronous directional transmissions within a WWAN in accordance with an example.

FIG. 11 illustrates a device 1102 operating at an illuminated/first eNodeB 1104 that is illuminated by a DL transmission 1106 from a transmit/adjacent eNodeB 1108. In alternative embodiments, the device can reside at a network level, such as within the Evolved Packet Core (EPC) or via an external network connected to the EPC via a Packet Data Network Gateway (PDN-GW). The device, for adapting to asymmetric UL and DL traffic loads in a WWAN in accordance with another example, can include various modules. Such modules can include a coupling measurement module 1110, an analysis module 1120, a configuration module 1130, and a communication module 1140.

The coupling measurement module 1110 can be configured to make a coupling measurement on a DL transmission from an adjacent eNodeB to the first eNodeB. The analysis module 1120 can be in communication with the coupling measurement module. Additionally, the analysis module can be configured to compare the coupling measurement to a coupling threshold. Where the coupling measurement is at or above the coupling threshold, the analysis module determines that the first eNodeB and the adjacent eNodeB are coupled. Where the coupling measurement is below the coupling threshold, the analysis module determines that the first eNodeB and the adjacent eNodeB are isolated.

The configuration module 1130 can be in communication with the analysis module 1120. Additionally, the configuration module can be configured to identify a common UL-DL configuration where the first eNodeB and the adjacent eNodeB are coupled. The configuration module can also identify a first UL-DL configuration for the first eNodeB independently of a second UL-DL configuration for the adjacent eNodeB where the first eNodeB and the adjacent eNodeB are isolated.

In some embodiments, the device 1102 can also include a communication module 1140, in communication with the configuration module 1130. The communication module can be configured to send traffic direction information about traffic direction needs at the first eNodeB to the adjacent eNodeB. It can also be configured to receive traffic direction information about traffic direction needs at the adjacent eNodeB.

In certain embodiments, an update module 1132 can be provided in communication with the configuration module 1130. Where the first eNodeB and the adjacent eNodeB are coupled in the common cluster, the update module can be configured to update the common UL-DL configuration to adapt in substantially real time to changing traffic direction needs at both the first eNodeB and the adjacent eNodeB. Where the first eNodeB and the adjacent eNodeB are isolated, the update module can update the first TDD configuration independently of the second TDD configuration to adapt in real time to changing traffic direction needs at the first eNodeB.

In such embodiments, a calculation module 1122, in communication with the analysis module 1120, can also be provided. The calculation module can be configured to calculate the coupling threshold. This calculation can be performed on the basis of estimating a level of DL inter-cell interference by analyzing a coupling metric in terms of the coupling measurement and a transmission power of the adjacent eNodeB. The calculation can also be performed on the basis of useful signal powers associated with multiple user terminals associated with the first eNodeB. Additionally, among other approaches, the calculation may be made on the basis of UL inter-cell interference associated with multiple deployed eNodeBs during a time where all eNodeBs operate to receive uplink transmission.

Additionally, some embodiments can include an optimization module 1124 in communication with the calculation module 1122. The optimization module can be configured to optimize the coupling threshold. Optimization within the optimization module can be based on feedback. Feedback can provide information about throughput, a path gain measurement, SINR, system traffic loading, and/or cell traffic loading information, among other possibilities.

Some embodiments can include a merger module 1142 in communication with the communication module 1140. The merger module can be configured to respond to an eNodeB list from a second cluster of coupled eNodeBs. The list can be used to determine a need to merge the second cluster and a first cluster to which the eNodeB belongs. With respect to such a determination, the first cluster can be any of the common cluster and the first eNodeB in isolation. Such a determination is made where the eNodeB list includes an intersection eNodeB common to the first cluster and the second cluster. Otherwise, the merger module makes a determination to leave the first cluster unaltered.

Also, an isolation module 1144, in communication with the communication module 1140, can be included is some embodiments. The isolation module 1144 can be configured to indicate when a second cluster and an isolated eNodeB belonging to the common cluster can have a UL-DL configuration distinct from the common UL-DL configuration of the common cluster. The ability to have different UL-DL configurations can be due to changing transmission patterns.

Figure 12:
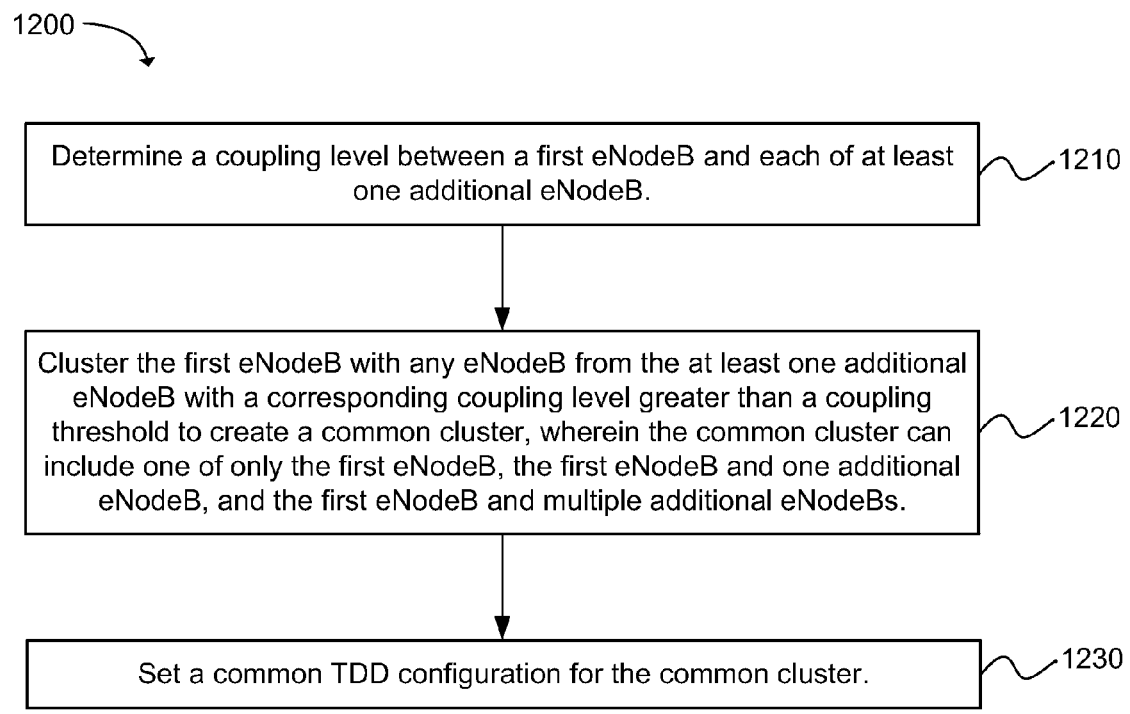
FIG. 12 is a flowchart depicting another generalized process for measuring interference potential to create eNodeB clusters allowing adaptive, asynchronous directional transmissions within a WWAN in accordance with an example.

FIG. 12 depicts a flowchart for a particular clustering method 1200 for mitigating interference during adaption to asymmetric downlink transmission among multiple eNodeBs, in accordance with an example. The method can, but need not necessarily, be embedded in a computer program product comprising a non-transitory computer usable medium. The computer readable medium can have a computer readable program code embodied therein. The computer readable program code can be adapted to be executed to implement instructions for the method. In embodiments embedded in a computer program product, the computer program product can reside on one or more of an MCN, an LPN, and a network level entity.

The method 1200 can comprise determining 1210 a coupling level between a first eNodeB and each of at least one additional eNodeB. The method can proceed by clustering 1220 the first eNodeB with any eNodeB from the at least one additional eNodeB with a corresponding coupling level greater than a coupling threshold. The clustering can create a common cluster. The common cluster can include one of only the first eNodeB, the first eNodeB and one additional eNodeB, and the first eNodeB and multiple additional eNodeBs. An additional step can involve setting 1230 a common TDD configuration for the common cluster.

In embodiments where the common cluster comprises at least one additional eNodeB in addition to the first eNodeB, such embodiments can further comprise communicating directional traffic information from the first eNodeB to the at least one additional eNodeB in the common cluster over a backhaul link. Such embodiments can also further comprise receiving at the first eNodeB directional traffic information over the backhaul link from the at least one additional eNodeB in the common cluster. Such embodiments can also further comprise monitoring the common cluster for changing directional traffic demands in the common cluster. Additionally, they can comprise adapting the common TDD configuration for the common cluster in substantially real time. These adaptations can respond to the changing directional traffic demands independently of any TDD configuration corresponding to any eNodeB outside of the common cluster.

The coupling threshold can be calculated by using knowledge about at least one transmission power of at least one of the at least one additional eNodeBs to estimate a level of inter-cell interference. In certain embodiments, the coupling threshold may be calculated by averaging a plurality of useful signal powers associated with multiple eNodeBs in the common cluster. Also, the coupling threshold can be calculated by averaging a plurality of levels of UL inter-cell interference associated with multiple eNodeBs in the common cluster. These levels of uplink inter-cell interference can be measured during a time where all eNodeBs in the common cluster operate to receive uplink transmission. Additional approaches to calculating the coupling threshold, apparent to those of ordinary skill in the art, are possible. Also, some embodiments can further comprise optimizing the coupling threshold with feedback about one or both of throughput received at the at least one additional eNodeB and a coupling level for the at least one additional eNodeB.

The method 1200 can also further comprise acquiring a list of eNodeBs in a second cluster of eNodeBs from a contact eNodeB in the second cluster of eNodeBs. The second cluster of eNodeBs can have any number of member eNodeBs, including a single member eNodeB. Where the common cluster and the second cluster share an intersection eNodeB, such embodiments can further comprise merging the second cluster of eNodeBs with the common cluster for purposes of determining the common TDD configuration.

Figure 13:
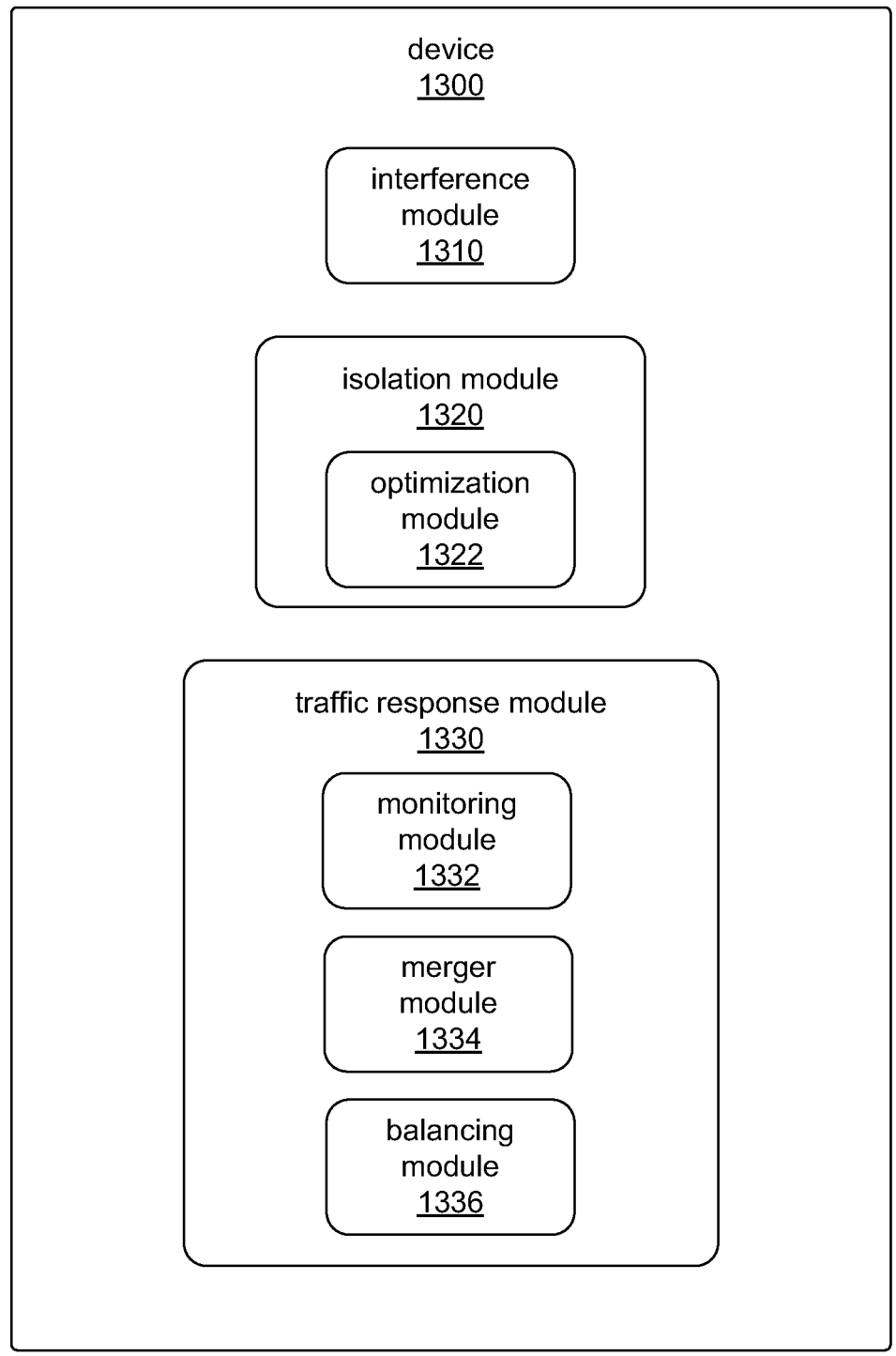
FIG. 13 is a block diagram illustrating a device for avoiding interference while adapting to asynchronous directional traffic at various eNodeBs in a WWAN in accordance with an example; and, FIG. 14 is a block diagram of a UE in accordance with an example.

FIG. 13 illustrates a device 1300 for avoiding interference while adapting to asynchronous directional traffic at various eNodeBs in a WWAN in accordance with another example. The device can operate at an eNodeB and/or at a network level. Within the device, several modules can be included, such as an interference module 1310, an isolation module 1320, and a traffic response module 1330. The device can reside on one or more of an MCN eNodeB, an LPN, and a network entity at a network level.

The interference module 1310 can be configured to estimate an interference level from a DL eNodeB as received at the first eNodeB. The isolation module 1320, in communication with the interference module, can be configured to indicate where the interference level is sufficiently low to allow the first eNodeB to be isolated. An isolated first eNodeB can accommodate UL transmission while the downlink eNodeB transmits a downlink transmission. Where the interference level is sufficiently high, the isolation module can require the first eNodeB and the downlink eNodeB to be aggregated in a common cluster to synchronize or coordinate transmission directions. The traffic response module 1330, in communication with the isolation module, can be configured to create a TDD configuration. Where the first eNodeB belongs to the common cluster, the TDD configuration can respond to directional traffic for eNodeBs associated with the first eNodeB in the common cluster. Where the first eNodeB is isolated, the TDD configuration can independently respond to directional traffic for the first eNodeB.

A monitoring module 1332 can also be included in the device 1300 in communication with the traffic response module 1330. The monitoring module can be configured to monitor directional traffic for eNodeBs associated with the first eNodeB in the common cluster where the first eNodeB belongs to the common cluster. In such embodiments, directional traffic information can be communicated from at least one other eNodeB in the common cluster to the first eNodeB over a low-latency backhaul infrastructure. Where the first eNodeB is isolated, the monitoring module can monitor just the first eNodeB. The monitoring module can also indicate to the traffic response module when to change the TDD configuration to accommodate a change in directional traffic in substantially real time.

The device 1300 can also include a merger module 1334, in communication with the traffic response module 1330. The merger module 1334 can be configured to include at least one of an additional eNodeB and an additional cluster to the common cluster. This addition can be made upon a determination that at least one of the additional eNodeB and the additional cluster share a common eNodeB with the common cluster. Additionally, the device can include a balancing module, in communication with the traffic response module. The balance module can be configured to reconcile competing uplink and downlink directional traffic demands at different eNodeBs within the common cluster to create the TDD configuration. The TDD configuration can be created so as to respond to the competing traffic demands.

Figure 14:
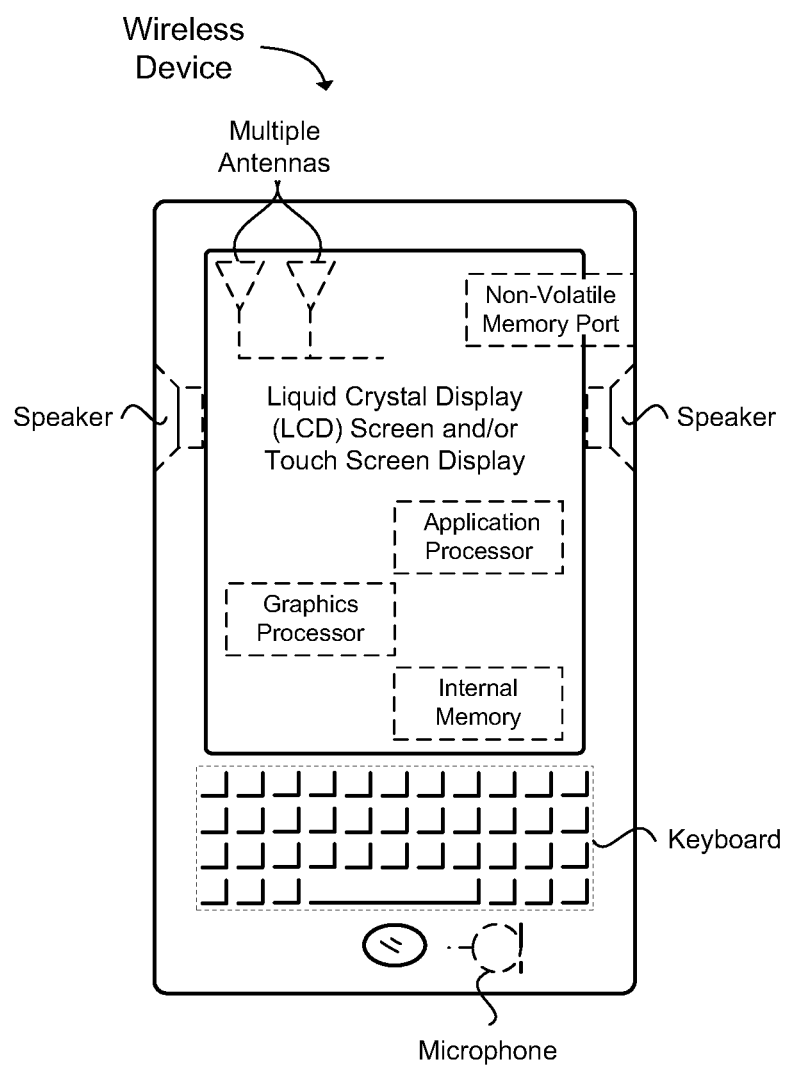

Some embodiments can include an optimization module 1322 in communication with the isolation module 1320. The isolation module can be configured to optimize a coupling threshold used to determine whether the first eNodeB belongs to the common cluster by monitoring the inter-cell interference level from opposite transmission directions of adjacent cells. The optimization module can also optimize the coupling threshold by analyzing traffic adaptation capabilities and traffic demands within a set of isolated cells and a set of common cell clusters FIG. 14 provides an example illustration of a mobile device, such as UE, a mobile station (MS), a mobile wireless device, a mobile communication device, a tablet, a handset, or other type of mobile wireless device. The mobile device can include one or more antennas configured to communicate with a base station (BS), an eNodeB, or other type of WWAN access point. While two antennas are shown, the mobile device may have between one and four or more antennas. The mobile device can be configured to communicate using at least one wireless communication standard including 3GPP LTE, Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 14 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for interference management and traffic adaptation in a wireless network with different Up Link and Down Link time slots and adaptive, asynchronous directional traffic resource allocation, the method comprising:
   measuring, at a first eNodeB, a unit of coupling information between the first eNodeB and an adjacent eNodeB;
   making a clustering determination based on the unit of coupling information, wherein the clustering determination comprises one of a first determination that the first eNodeB and the adjacent eNodeB belong in a common cluster and a second determination that the first eNodeB and the adjacent eNodeB are isolated, wherein making the clustering determination based on the unit of coupling information further comprises reaching the first determination where at least one of a first condition and a second condition is met, wherein:
      the first condition is that a performance of the first eNodeB is not substantiall egraded by a transmission direction of the adjacent eNodeB, and
      the second condition is that a change of the transmission direction of the adjacent eNodeB does not substantially degrade the performance of the first eNodeB; and,
      otherwise reaching the second determination; and
   configuring the first eNodeB and the adjacent eNodeB with a common Up Link-Down Link (UL-DL) configuration where the fi rst determination has been made and configuring the first eNodeB with a first UL-DL configuration independently from a potentially differing UL-DL configuration pertaining to the adjacent eNodeB where the second determination has been made.

2. The method of claim 1, wherein a coupling metric is selected to characterize the unit of coupling information and a coupling threshold is used to determine that the performance of the first eNodeB is substantially degraded where the unit of coupling information is one of at the coupling threshold and above the coupling threshold for the coupling metric, otherwise that the first eNodeB is not substantially degraded where the unit of coupling information is below the coupling threshold for the coupling metric.

3. The method of claim 2, further comprising determining the coupling threshold based on one of:
an estimate of a level of inter-cell interference calculated from the unit of coupling information where a transmission power of the adjacent eNodeB is known;
an average power of a useful UL signal; and
an average level of uplink inter-cell interference where all eNodeBs in the common cluster operate to receive uplink transmission.

4. The method of claim 1, further comprising one of:
merging the common cluster with a second cluster where the common cluster and the second cluster have at least one eNodeB in common that couples the common and adjacent clusters; and
dividing a merged cluster into sub-clusters where at least one adapted eNodeB within the merged cluster can adapt to changing traffic demands in a manner such that at least one of the first condition and the second condition no longer obtain between the at least one adapted eNodeB and at least one additional eNodeB in the merged cluster, such that each sub-cluster can apply a different UL-DL configuration.

5. The method of claim 1, further comprising adapting a UL-DL configuration in substantially real-time to changing uplink and downlink traffic demands at any of the first eNodeB and the adjacent eNodeB, wherein the UL-DL configuration comprises one of:
the common UL-DL configuration where the first determination has been made and the changing UL and DL traffic demands are communicated between eNodeBs in the common cluster over a low-latency backhaul infrastructure, and
the first UL-DL configuration where the second determination has been made.

6. The method of claim 1, further comprising communicating at least one of uplink and downlink traffic needs between the first eNodeB and the adjacent eNodeB in the common cluster over a low-latency backhaul infrastructure.

7. The method of claim 6, further comprising determining at least one of the common UL-DL configuration and a restricted set of UL-DL configurations for the common UL-DL configuration on the basis of at least one of joint UL and DL needs throughout the common cluster and splitting a difference between UL and DL traffic demands at the first eNodeB and the adjacent eNodeB in the common cluster.

8. A device for adapting to asymmetric uplink and Down Link traffic loads in a wireless network comprising:
a coupling measurement module, operating at one of a first eNodeB and a network level entity, configured to a make coupling measurement on a Down Link (DL) transmission from an adjacent eNodeB to the first eNodeB, wherein the coupling measurement module is implemented as a hardware circuit or is stored in a memory device for execution by a computer processor;
an analysis module, in communication with the coupling measurement module, configured to compare the coupling measurement to a coupling threshold to determine that the first eNodeB and the adjacent eNodeB are coupled where the coupling measurement is one of at the coupling threshold and above the coupling threshold, and to determine that the first eNodeB and the adjacent eNodeB are isolated where the coupling measurement is below the coupling threshold, wherein the analysis module is implemented as a hardware circuit or is stored in a memory device for execution by a computer processor;
a configuration module, in communication with the analysis module, configured to identify a common Up Link (UL)-DL configuration where the first eNodeB and the adjacent eNodeB are coupled and a first UL-DL configuration for the first eNodeB independently of a second UL-DL configuration for the adjacent eNodeB where the first eNodeB and the adjacent eNodeB are isolated, wherein the configuration module is implemented as a hardware circuit or is stored in a memory device for execution by a computer processor; and
an update module, in communication with the configuration module, wherein the update module is implemented as a hardware circuit or is stored in a memory device for execution by a computer processor and the update module is configured to do one of:
update the common UL-DL configuration to adapt in substantially real time to changing traffic direction needs at both the first eNodeB and the adjacent eNodeB where the first eNodeB and the adjacent eNodeB are coupled in the common cluster; and
update the first UL-DL configuration independently of the second UL-DL configuration to adapt substantially in real time to changing traffic direction needs at the first eNodeB where the first eNodeB and the adjacent eNodeB are isolated.

9. The device of claim 8, further comprising a communication module, in communication with the configuration module, wherein the communication module is implemented as a hardware circuit or is stored in a memory device for execution by a computer processor and the communication module is configured to do at least one of
send traffic direction information about traffic direction needs at the first eNodeB to the adjacent eNodeB; and
receive traffic direction information about traffic direction needs at the adjacent eNodeB.

10. The device of claim 8, further comprising a calculation module, in communication with the analysis module, wherein the calculation module is implemented as a hardware circuit or is stored in a memory device for execution by a computer processor and the calculation module is configured to calculate the coupling threshold based on at least one of:
an estimate of a level of DL inter-cell interference by analyzing a coupling metric in terms of the coupling measurement and transmission power of the adjacent eNodeB;
useful signal powers associated with multiple user terminals associated with the first eNodeB; and
uplink inter-cell interference associated with multiple deployed eNodeBs measured during a time where all eNodeBs operate to receive a UL transmission.

11. The device of claim 10, further comprising an optimization module, in communication with the calculation module, wherein the optimization module is implemented as a hardware circuit or is stored in a memory device for execution by a computer processor and the optimization module is configured to optimize the coupling threshold based on feedback about at least one of throughput, a coupling measurement, Signal to Interference plus Noise Ratio (SINR), and one of system and cell traffic loading information can be used to optimize the value of coupling threshold.

12. The device of claim 8, further comprising a merger module, in communication with the communication module, wherein the merger module is implemented as a hardware circuit or is stored in a memory device for execution by a computer processor and the merger module is configured to respond to an eNodeB list from a second cluster of coupled eNodeBs to determine a need to merge the second cluster and a first cluster to which the eNodeB belongs, wherein the first cluster can be any of the common cluster and the first eNodeB in isolation, where the eNodeB list includes an intersection eNodeB common to the first cluster and the second cluster; and otherwise to leave the first cluster unaltered.

13. The device of claim 8, further comprising an isolation module, in communication with the communication module, wherein the isolation module is implemented as a hardware circuit or is stored in a memory device for execution by a computer processor configured to indicate when at least one of the second cluster and an isolated eNodeB belonging to the common cluster can have a UL-DL configuration distinct from the common UL-DL configuration of the common cluster.

14. A computer program product comprising a non-transitory computer usable medium having a computer readable program code embodied therein, the computer readable program code adapted to be executed to implement instructions for a method for mitigating interference during adaption to asymmetric DL transmission among multiple eNodeBs, the method comprising:
  determining a coupling level between a first eNodeB and each of at least one additional eNodeB;
  clustering the first eNodeB with any eNodeB from the at least one additional eNodeB with a corresponding coupling level greater than a coupling threshold to create a common cluster, wherein the common cluster comprises the first eNodeB and the at least one additional eNodeB;
  setting a common Time Division Duplex (TDD) configuration for the common cluster to avoid interference between uplink (UL) traffic and DL (downlink) traffic; and at least one of:
  communicating directional traffic information from the first eNodeB to the at least one additional eNodeB in the common cluster over a backhaul link; and
  receiving at the first eNodeB directional traffic information over the backhaul link from the at least one additional eNodeB in the common cluster.

15. The computer program product of claim 14, further comprising:
  monitoring the common cluster for changing directional traffic demands in the common cluster; and
  adapting the common TDD configuration for the common cluster in substantially real time to respond to the changing directional traffic demands independently of any TDD configuration corresponding to any eNodeB outside of the common cluster.

16. The computer program product of claim 14, further comprising calculating the coupling threshold by:
  using knowledge about at least one transmission power of at least one of the at least one additional eNodeBs to estimate a level of inter-cell interference;
  averaging a plurality of useful signal powers associated with multiple eNodeBs in the common cluster; and
  averaging a plurality of levels of UL inter-cell interference associated with multiple eNodeBs in the common cluster measured during a time where all eNodeBs in the common cluster operate to receive UL transmission.

17. The computer program product of claim 14, the method further comprising optimizing the coupling threshold with feedback about at least one of throughput received at the at least one additional eNodeB and a coupling level for the at least one additional eNodeB.

18. The computer program product of claim 14, further comprising:
  acquiring a list of eNodeBs in a second cluster of eNodeBs from a contact eNodeB in the second cluster of eNodeBs, wherein the second cluster of eNodeBs can have any number of member eNodeBs, including a single member eNodeB; and
  merging the second cluster of eNodeBs with the common cluster for purposes of determining the common TDD configuration where the common cluster and the second cluster share an intersection eNodeB.

19. The computer program product of claim 14, wherein the non-transitory computer usable medium having a computer readable program code embodied therein is further configured to reside on at least one of a MaCro-eNodeB (MCN), a Low Power Node (LPN), and a network level entity.

20. A device for avoiding interference while adapting to asynchronous directional traffic at various eNodeBs in a wireless network, the device comprising:
  an interference module configured to estimate an interference level from a Down Link (DL) eNodeB as received at the first eNodeB, wherein the interference module is implemented as a hardware circuit or is stored in a memory device for execution by a computer processor;
  an isolation module, in communication with the interference module and operating at the first eNodeB, configured to indicate where the interference level is sufficiently low to allow the first eNodeB to be isolated by accommodating UL transmission while the DL eNodeB transmits a DL transmission and where the interference level is sufficiently high to require the first eNodeB and the DL eNodeB to be aggregated in a common cluster to synchronize transmission directions, wherein the isolation module is implemented as a hardware circuit or is stored in a memory device for execution by a computer processor; and
  a traffic response module, in communication with the isolation module and operating at the first eNodeB, configured to create a Time Division Duplex (TDD) configuration to respond to directional traffic for eNodeBs associated with the first eNodeB in the common cluster where the first eNodeB belongs to the common cluster and independently respond to directional traffic for the first eNodeB where the first eNodeB is isolated, wherein the traffic response module is implemented as a hardware circuit or is stored in a memory device for execution by a computer processor; and
  an optimization module, in communication with the isolation module and operating at the first eNodeB, wherein the optimization module is implemented as a hardware circuit or is stored in a memory device for execution by a computer processor and the optimization module is configured to optimize a coupling threshold used to determine whether the first eNodeB belongs to the common cluster by:
    monitoring the inter-cell interference level from opposite transmission directions of adjacent cells; and
    analyzing traffic adaptation capabilities and traffic demands within a set of isolated cells and a set of common cell clusters.

21. The device of claim 20, further comprising a monitoring module, in communication with the traffic response module and operating at the first eNodeB, wherein the monitoring module is implemented as a hardware circuit or is stored in a memory device for execution by a computer processor and the monitoring module is configured to:

monitor directional traffic for eNodeBs associated with the first eNodeB in the common cluster where the first eNodeB belongs to the common cluster, where directional traffic information is communicated from at least one other eNodeB in the common cluster to the first eNodeB over a low-latency backhaul infrastructure, and monitor just the first eNodeB where the first eNodeB is isolated; and indicate to the traffic response module when to change the TDD configuration to accommodate a change in directional traffic in near real time.

22. The device of claim 20, further comprising a merger module, in communication with the traffic response module and operating at the first eNodeB, wherein the merger module is implemented as a hardware circuit or is stored in a memory device for execution by a computer processor and the merger module is configured to include at least one of an additional eNodeB and an additional cluster to the common cluster upon a determination that at least one of the additional eNodeB and the additional cluster share a common eNodeB with the common cluster.

23. The device of claim 20, further comprising a balancing module, in communication with the traffic response module and operating at the first eNodeB, wherein the balancing module is implemented as a hardware circuit or is stored in a memory device for execution by a computer processor and the balancing module is configured to reconcile competing UL and DL directional traffic demands at different eNodeBs within the common cluster to create the TDD configuration so as to respond to the competing traffic demands.

24. The device of claim 20, wherein the device resides on at least one of a MaCro-eNodeB (MCN), a Low Power Node (LPN), and a network entity at a network level.

\* \* \* \* \*